(12) United States Patent
Kay et al.

(10) Patent No.: US 11,324,981 B2
(45) Date of Patent: May 10, 2022

(54) SYSTEMS AND METHODS FOR DETERMINING READINESS OF A FIRE APPARATUS

(71) Applicant: Oshkosh Corporation, Oshkosh, WI (US)

(72) Inventors: David R. Kay, Appleton, WI (US); Eric R. Linsmeier, Larsen, WI (US); Chad T. Dolphin, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 97 days.

(21) Appl. No.: 16/692,732

(22) Filed: Nov. 22, 2019

(65) Prior Publication Data

US 2020/0108285 A1    Apr. 9, 2020

Related U.S. Application Data

(63) Continuation of application No. 15/855,648, filed on Dec. 27, 2017, now Pat. No. 10,525,297, which is a
(Continued)

(51) Int. Cl.
*A62C 37/50* (2006.01)
*A62C 27/00* (2006.01)
(Continued)

(52) U.S. Cl.
CPC .............. *A62C 37/50* (2013.01); *A62C 27/00* (2013.01); *G01F 23/0076* (2013.01);
(Continued)

(58) Field of Classification Search
CPC ................................. A62C 37/00; A62C 37/50
See application file for complete search history.

(56) References Cited

U.S. PATENT DOCUMENTS 7,339,477 B2    3/2008    Puzio et al.
7,389,826 B2    6/2008    Linsmeier et al.
(Continued)

FOREIGN PATENT DOCUMENTS

WO    WO-2006/015242    2/2006
WO    WO-2006/015272    2/2006
(Continued)

OTHER PUBLICATIONS

International Search Report and Written Opinion on PCT/US2018/013164, dated Sep. 4, 2018, 23 pages.
(Continued)

*Primary Examiner* — Jess Whittington
(74) *Attorney, Agent, or Firm* — Foley & Lardner LLP

(57) ABSTRACT

A readiness monitoring system for a fire apparatus includes a processing circuit that has programmed instructions to acquire fluid level data indicating at least one of a water level within a water tank, a fire suppressing agent level within an agent tank, a fuel level within a fuel tank, or a diesel exhaust fluid level within a diesel exhaust fluid reservoir of the fire apparatus; acquire fault data indicating any active faults with components of the fire apparatus; acquire maintenance data indicating whether maintenance is due or overdue; acquire exercise data indicating an elapsed time since the fire apparatus was last exercised; and determine a readiness score for the fire apparatus based on the fluid level data, the fault data, the maintenance data, and the exercise data.

12 Claims, 8 Drawing Sheets

Related U.S. Application Data continuation-in-part of application No. 15/483,763, filed on Apr. 10, 2017, now Pat. No. 10,685,510.

(51) Int. Cl.
    *G07C 5/08*     (2006.01)
    *G07C 5/00*     (2006.01)
    *G01F 23/00*     (2022.01)
    *G07C 5/12*     (2006.01)
    *G06Q 10/00*     (2012.01)

(52) U.S. Cl.
    CPC .............. *G06Q 10/00* (2013.01); *G07C 5/00* (2013.01); *G07C 5/006* (2013.01); *G07C 5/008* (2013.01); *G07C 5/085* (2013.01); *G07C 5/0808* (2013.01); *G07C 5/0816* (2013.01); *G07C 5/12* (2013.01)

(56) References Cited

U.S. PATENT DOCUMENTS

| | | | |
|---|---|---|---|
| 9,061,169 B2 | 6/2015 | Linsmeier | |
| 9,802,557 B2 | 10/2017 | Shore et al. | |
| 2003/0158635 A1* | 8/2003 | Pillar | B60R 16/0315 701/1 |
| 2006/0022001 A1 | 2/2006 | Linsmeier et al. | |
| 2006/0032701 A1 | 2/2006 | Linsmeier et al. | |
| 2006/0032702 A1 | 2/2006 | Linsmeier et al. | |
| 2006/0065411 A1 | 3/2006 | Linsmeier et al. | |
| 2006/0086566 A1 | 4/2006 | Linsmeier et al. | |
| 2009/0300548 A1 | 12/2009 | Sullivan et al. | |
| 2013/0000297 A1 | 1/2013 | Moravec et al. | |
| 2013/0158777 A1 | 6/2013 | Brauer et al. | |
| 2014/0062700 A1* | 3/2014 | Heine | G06Q 10/08 340/572.1 |
| 2014/0075198 A1 | 3/2014 | Peirce et al. | |
| 2014/0240125 A1* | 8/2014 | Burch | G06Q 10/06 340/539.13 |
| 2014/0262355 A1 | 9/2014 | Linsmeier | |
| 2015/0193993 A1* | 7/2015 | Rood | F02D 41/22 701/51 |
| 2015/0239365 A1* | 8/2015 | Hyde | B60L 7/12 701/2 |
| 2016/0304051 A1 | 10/2016 | Archer et al. | |
| 2017/0090601 A1* | 3/2017 | Logan | A61J 7/0076 |
| 2018/0042540 A1* | 2/2018 | Kinnunen | A61B 5/16 |
| 2018/0075547 A1* | 3/2018 | Pere | G06Q 10/06314 |
| 2018/0164828 A1* | 6/2018 | Dumitras | B25J 9/1676 |
| 2018/0189725 A1* | 7/2018 | Mattingly | G06K 19/0723 |
| 2018/0336413 A1* | 11/2018 | Zhao | G06K 9/00684 |

FOREIGN PATENT DOCUMENTS

| | | |
|---|---|---|
| WO | WO-2006/037100 | 4/2006 |
| WO | WO-2006/101865 | 9/2006 |
| WO | WO-2011/036495 | 3/2011 |
| WO | WO-2013/052698 A1 | 4/2013 |
| WO | WO-2016/171965 | 10/2016 |

OTHER PUBLICATIONS

Third Party Submission on U.S. Appl. No. 15/483,763, dated Apr. 5, 2019, 32 pages.

Third Party Submission on U.S. Appl. No. 15/855,648, dated Apr. 5, 2019, 27 pages.

* cited by examiner

US 11,324,981 B2

SYSTEMS AND METHODS FOR DETERMINING READINESS OF A FIRE APPARATUS

CROSS-REFERENCE TO RELATED PATENT APPLICATIONS

This application is a continuation of U.S. patent application Ser. No. 15/855,648, filed Dec. 27, 2017, which is a continuation-in-part of U.S. patent application Ser. No. 15/483,763, filed on Apr. 10, 2017, both of which are incorporated herein by reference in their entireties.

BACKGROUND

Traditional response vehicles include various features and systems for assisting an operator of the response vehicle in response to an instance. For instance, if an engine component is not functioning as it should, a "check engine" light may notify the operator. Such systems are limited in that they lack specificity in terms of the information that they provide. Upon seeing such a "check engine" light, the operator is unaware of the particular aspect of the engine that is defective. Additionally, since such warning systems are completely onboard the vehicle, the operator is only notified of the vehicle's deficiency once inside of the vehicle and attempting to operate it in urgent circumstances. Thus, it would be beneficial to enable emergency response personnel to view more information pertaining to the operational status of the response vehicle well in advance of attempting to utilize the vehicle.

What is more, traditional systems are further limited in that they typically only notify personal of the operational status of components of the vehicle itself. Due to the dangerous circumstances that response vehicles are frequently in, the emergency response equipment within a response vehicle (e.g., hoses, axes, compressed air tanks, and the like) is a crucial component of the vehicles' readiness. Accordingly, it would be further beneficial provide a system that informs personnel of an emergency response vehicle's readiness not only in terms of various subsystems of the vehicle, but also of the equipment on the vehicle.

SUMMARY

The invention is capable of other embodiments and of being carried out in various ways. Alternative exemplary embodiments relate to other features and combinations of features.

One embodiment relates to a fire apparatus. The fire apparatus includes an engine, at least one of (i) a water tank configured to store water or (ii) an agent tank configured to store a fire suppressing agent, a fuel tank configured to store a fuel used to power the engine, and a processing circuit. The processing circuit has programmed instructions monitor fluid level data indicating at least one of a water level within the water tank, a fire suppressing agent level within the agent tank, or a fuel level within the fuel tank; monitor fault data indicating any active faults with components of the fire apparatus; monitor maintenance data indicating whether maintenance is due or overdue; monitor exercise data indicating an elapsed time since the fire apparatus was last exercised including the elapsed time since at least one of starting the engine, driving the fire apparatus, engaging a fluid pump of the fire apparatus, or opening a fluid discharge of the fire apparatus; and determine a readiness score for the fire apparatus based on the fluid level data, the fault data, the maintenance data, and the exercise data.

Another embodiment relates to a readiness monitoring system for a fire apparatus. The readiness monitoring system includes a processing circuit. The processing circuit has programmed instructions to acquire fluid level data indicating at least one of a water level within a water tank, a fire suppressing agent level within an agent tank, a fuel level within a fuel tank, or a diesel exhaust fluid level within a diesel exhaust fluid reservoir of the fire apparatus; acquire fault data indicating any active faults with components of the fire apparatus; acquire maintenance data indicating whether maintenance is due or overdue; acquire exercise data indicating an elapsed time since the fire apparatus was last exercised; and determine a readiness score for the fire apparatus based on the fluid level data, the fault data, the maintenance data, and the exercise data.

Yet another embodiment relates to a method for evaluating a readiness of a fire apparatus to respond to an incident. The method includes acquiring, by a processing circuit, fluid level data indicating at least one of (i) a water level within a water tank, (ii) a fire suppressing agent level within an agent tank, (iii) a fuel level within a fuel tank, or (iv) a diesel exhaust fluid level within a diesel exhaust fluid reservoir of the fire apparatus; acquiring, by the processing circuit, fault data indicating any active faults with components of the fire apparatus; determining, by the processing circuit, a base readiness value based on at least one of the water level or the fire suppressing agent level; determining, by the processing circuit, a reduction value based on at least one of the fuel level, the active faults, or the diesel exhaust fluid level; and determining, by the processing circuit, a readiness score for the fire apparatus based on the base readiness value and the reduction value.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
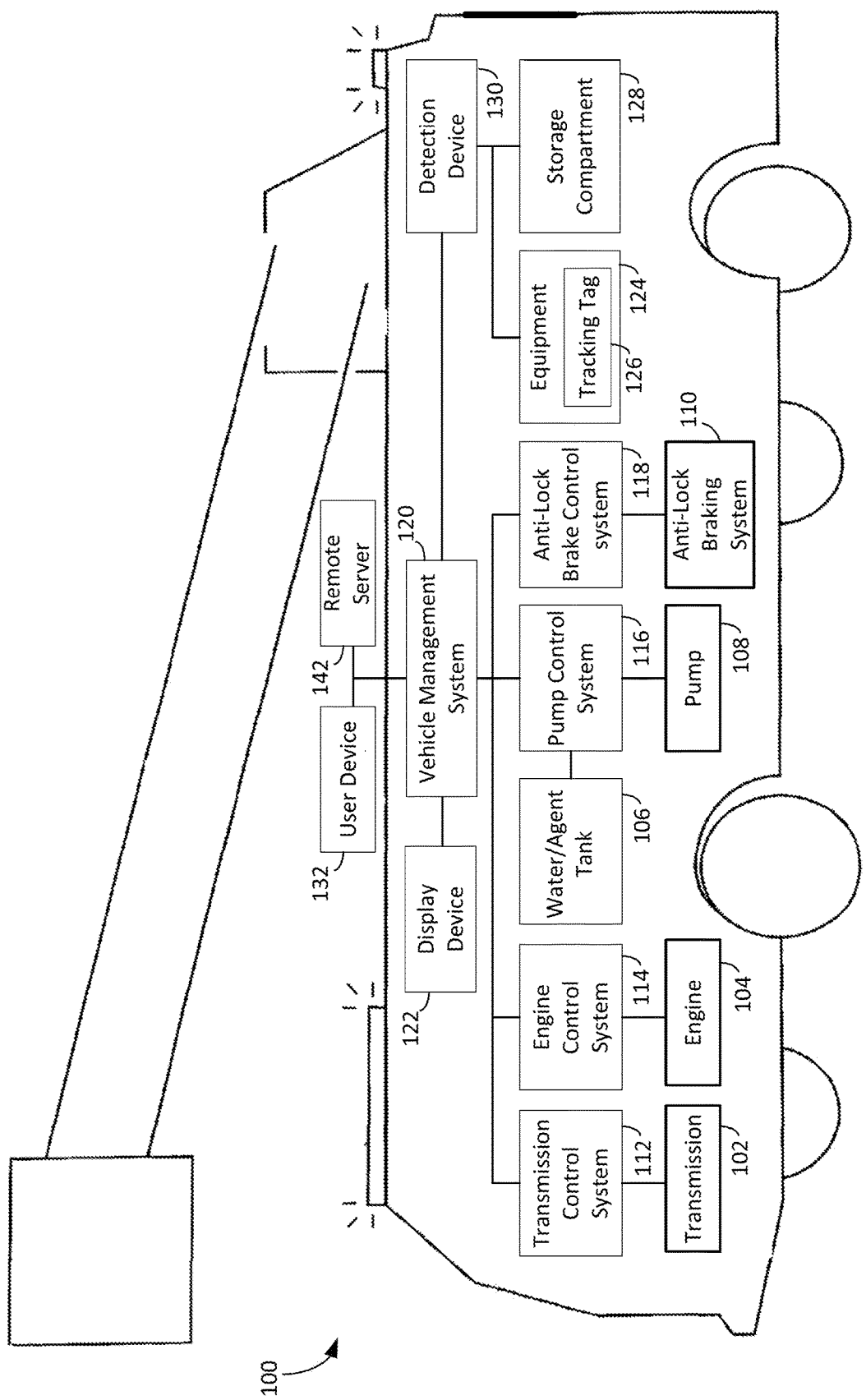
FIG. 1 is a perspective view of a response vehicle including various features described herein, according to an exemplary embodiment.

Before turning to the figures, which illustrate the exemplary embodiments in detail, it should be understood that the present application is not limited to the details or methodology set forth in the description or illustrated in the figures. It should be understood that the terminology is for the purposes of description only and should not be regarded as limiting.

Systems and methods are described herein for providing various features as part of a response vehicle management system associated with a response vehicle. More particularly, systems and methods are described for providing a response vehicle control and monitoring system. The control and monitoring system includes or interacts with various sensors dispersed throughout the response vehicle. Each of the sensors may capture signals regarding an operational aspect of a vehicle subsystem (e.g., a transmission, a water pump, a generator, a governor, a braking system, a lighting system, and the like). The vehicle management system is configured to receive the signals captured by the sensors and generate a vehicle subsystem display dataset based on the received signals. The vehicle subsystem display datasets are then provided to a display, such that an operator is presented with graphical representations of various operational aspects of a plurality of response vehicle subsystems. Thus, the operator is made aware of the operational readiness of the vehicle to respond to an emergency situation.

The vehicle response and control system further includes a transceiver configured to interface with a user device (e.g., a smartphone, tablet, laptop, etc.) of a user. The vehicle response and control system may further format any generated display datasets (e.g., the vehicle subsystem display discussed above) for transmittal by way of the transceiver to the user device. For example, the vehicle subsystem display datasets may be formatted as a webpage that is viewable via a web browser on the user device. Thus, the user is able to monitor the operational readiness of the vehicle from outside of the vehicle, thus enabling the vehicle's readiness to be assessed well in advance of an urgent situation.

Additionally, the vehicle response and control system is further configured to receive indications of the presence of various pieces of emergency response equipment that is within the response vehicle. In some embodiments, such indications are received from a detector included or associated with the vehicle management system. For example, each piece of emergency response equipment may include a radio frequency identification tag that transmits a radio frequency signal that is picked up by the detector (e.g., an antenna). Alternatively or additionally, such indications may be received from the user device via the transceiver. For example the user may provide an input on the user device indicating the presence of various pieces of equipment by scanning a barcode or the like affixed to the pieces of equipment. In any event, based on the received indications, the response and control system is configured to generate an inventory display dataset and transmit the inventory display dataset to the display and/or the user device. Thus, various personnel are able to view the status of the response vehicle's inventory.

In another respect, the vehicle response and control system is further configured to provide assistance to a user in the inspection of the response vehicle. In this regard, the vehicle response and control system may include a database storing a plurality of inspection instructions datasets that are specifically formatted to be viewable via the user device. The vehicle response and control system may transmit such datasets to the user device via the transceiver, such that the user is presented with various inspection interfaces instructing the user to inspect various vehicle subsystems and emergency response equipment associated with the vehicle and provide various inputs indicative of the condition of the identified equipment. Having received such user inputs, the sensor signals, and the indications of the presence of emergency response equipment, the vehicle response and control system may determine an overall response readiness capability of the response vehicle. Such an overall readiness may be presented via the display or via the user device, such that emergency response personnel are aware of the overall readiness of the vehicle to response to an urgent situation.

Referring to FIG. 1, a response vehicle, shown as a fire truck 100, includes vehicle subsystems; shown as a transmission 102, an engine 104, a water/agent tank 106, a pump 108, and an anti-lock braking system 110; vehicle subsystem controllers, shown as a transmission control system 112, an engine control system 114, a pump control system 116, and an anti-lock brake control system 118; a vehicle management system 120; a display 122 (e.g., a vehicle mounted display in the cab of the fire truck 100, etc.); equipment 124; a storage compartment 128; and a detector 130. Other vehicle subsystems and corresponding controller systems may also be included in the fire truck 100. Such other system may include an interlock system, a transmission, a power take off (PTO), a foam system, a water tank, a lighting system, a life control device, etc.

According to the exemplary embodiment shown in FIGS. 1-8, the fire truck 100 is a municipal fire fighting vehicle. According to alternative embodiments, the fire truck may include an Aircraft Rescue Fire Fighting (ARFF) vehicle, a forest fire apparatus, an aerial truck, a rescue truck, a tanker, or still another type of fire fighting vehicle. According to still other embodiments, the vehicle is another type of vehicle (e.g., a military vehicle, a commercial vehicle, etc.).

In the exemplary embodiment shown, each vehicle subsystem controller 112-118 is configured to transmit control signals to corresponding vehicle subsystems 102-110 to facilitate the operation of the fire truck 100. For example, the engine control system 114 may provide a control signal to the throttle of the engine 104 of the fire truck 100 to control the combustion rate of fuel from a fuel source, thereby controlling the speed of the fire truck 100. In various example embodiments, the control signals provided by the vehicle subsystem controllers 112-118 may be dependent on various inputs provided by an operator of the fire truck 100. For example, the fire truck 100 may include an operator input (not shown) configured to receive inputs from the operator or other personnel and provide various inputs to vehicle subsystem controllers 112-118. The operator input may include one or more buttons, knobs, touchscreens, switches, levers, joysticks, pedals, or handles. For example, the operator input may include a button enabling the operator to change the operating mode of the pump control system 116 so as to pump water form a water source using the pump 108. In another example, the operator input may also include an accelerator pedal enabling the operator to provide an input signal to the engine control system 114. In some embodiments, such inputs may be provided via the vehicle management system 120 via processes described below. It should be understood that, in some embodiments, other vehicle subsystem controllers 112-118 may not provide such an input to their corresponding vehicle subsystems. For example, a tire inflation subsystem controller may merely monitor an attribute or aspect (e.g., the air pressure of various tires of the fire truck 100) rather than provide an actuating input to the tires.

In the exemplary embodiment shown, each vehicle subsystem controller 112-118 includes at least one sensor. Each sensor is configured to capture a sensor signal that is indicative of the status of an operational aspect of the corresponding vehicle subsystem 102-110. For example, a sensor associated with the transmission control system 112 may measure any combination of a transmission temperature, a transmission fluid level, and/or transmission state (e.g., the current gear of the transmission 102). In another example, a sensor associated with an engine 104 may measure any combination of an engine speed, engine hours, oil temperature, oil pressure, oil level, coolant level, fuel level, and so on. In another example, a sensor associated with a water/agent tank 106 may measure a water level of the water tank and/or an agent (e.g., foam fire suppressants, etc.) level of the agent tank. As will be appreciated, the form of the sensors will vary depending on the particular vehicle subsystem 102-110 that the sensor is configured to measure and the particular operational aspect of the vehicle subsystem 102-110 that the sensor is configured to measure.

The vehicle management system 120 is configured to enable the operator and other users to interface with various vehicle subsystems 102-110 of the fire truck and monitor various other aspects of the fire truck 100. In this regard, the vehicle management system 120 is configured to receive the sensor signals from the sensors discussed above, generate vehicle subsystem display datasets based on the received sensor signals, and transmit the display datasets to the display 122 and/or the user device 132 via the methods described below for presentation to the operator of the fire truck 100 or other user. In the exemplary embodiment shown, the vehicle management system 120 is further configured to establish connections with various devices (e.g., the user device 132 described below) and transmit various communications (e.g., instructions, data, and the like) to those external devices. A more detailed embodiment of the vehicle management system is explained below in relation to FIG. 2.

Still referring to FIG. 1, the fire truck 100 further includes a display, shown as display 122. Display 122 may be, for example, a touchscreen display (e.g., a CANlink® CL-711 display manufactured by HED Inc., etc.) having a resistive touchscreen that receives a touch input from a user. Display 122 may support any type of display feature, such as a flipbook-style animation, or any other type of transition feature. Display 122 may generally provide a plurality of navigation buttons that allow a user to select various displays and other options via touch. Display 122 may further, upon detection of a sensor signal captured by any of the vehicle subsystem controllers 112-118 generate a graphical representation of the sensor signal. For example, if a signal is received from a tire pressure sensor associated with a tire pressure control system, a tire pressure screen may be displayed that provides current tire pressure information for the response vehicle. Display 122 may have a wired or wireless connection with other response vehicle subsystems and/or with remote devices.

The display 122 may be configured to display a graphical user interface, an image, an icon, a notification, and indication, and/or still other information. In the exemplary embodiment shown, the display includes a graphical user interface configured to provide general information about the fire truck 100 captured by the various sensors included in the various vehicle subsystem controllers 110-118. Through such an interface, the operator of the fire apparatus may be able to view various fluid levels of the fire truck 100 (e.g., fuel level, water tank level, transmission fluid level, foam level, etc.), tire pressures, the mileage of the fire truck 100, battery voltage levels, and the like.

Additionally, via the graphical user interface, the operator may further be able to view the status of various other aspects of the fire truck 100. For example, as will be described below, the operator may view displays containing information regarding an inventory of the equipment 124 present on the fire truck 100. Additionally, the operator may also view displays assisting in the performance of an inspection of the fire truck 100 and reporting on the fire truck 100's readiness to respond to a dispatch call.

The display 122 may include any number of supporting buttons and other tactile user inputs to support interaction between a user and the display. For example, a plurality of push buttons may be located next to or below the display to provide the user with further options. It should be understood that the configuration of the display 122 may vary without departing from the scope of the present disclosure.

The display 122 may include or support various technologies. For example, the display 122 be a touchscreen display and may be separated into any number of portions (e.g., a split-screen type display, etc.). For example, a first portion of the screen may be reserved for one particular type of display (e.g., warnings and alerts, etc.), while another portion of the screen may be reserved for general vehicle information (e.g., speed, fuel level, etc.). The display 122 may be configured to handle any type of transition, animation, or other display feature that allows for ease of access of information on the display.

In one embodiment, the display 122 is coupled to a USB input, allowing the display software to be updated. For example, such updates may include updating the maps stored on the display (e.g., to improve navigation features, etc.). Further, custom files may be downloaded to the display (e.g., custom logos, images, text, etc.) to personalize the display 122 for use in the fire truck 100.

The display may include any number of video inputs (e.g., from one or more cameras located on the fire truck 100, etc.). For example, the display may be capable of receiving four video inputs and may display up to four video inputs simultaneously on the display. The display may be configured to detect when a camera feed is up, therefore determining when to display a video input on the display or not (e.g., not displaying a blank or blue screen, etc.).

To adequately respond to emergency situations, the fire truck 100 not only needs to be in working order (i.e., the vehicle subsystems 102-110 must be functional), but also have various types of emergency response equipment, shown as equipment 124, onboard. The equipment 124 may include any object that is used by emergency response personnel in responding to calls or the like. Examples of the equipment 124 include radios, personal protection equipment (e.g., safety goggles, self-contained breathing apparatuses, compressed air cylinders, and the like), ladders, various hand tools (e.g., crow bars, shovels, axes, and the like), rope, flares, generators, hoses, lighting devices (e.g., flashlights), first aid kits, and various other tools. To ensure all necessary equipment 124 is within the fire truck 100, each piece of equipment 124 may include a tracking tag 126.

In some embodiments, the fire truck 100 may include various storage compartments 128 for storing various pieces of equipment 124. In some embodiments, the storage compartments 128 are accessible from the exterior of the fire truck 100. For example, various storage compartments 128 may be located along the sides and rear of the fire truck 100. In some embodiments, each storage compartment 128 is designed to hold a predetermined set of pieces of equipment 124 in a predetermined configuration. For example, each storage compartment may include a plurality of fixing members (e.g., braces, hooks, slots, and the like) preconfigured to hold a particular piece of equipment 124.

The tracking tag 126 may include any device capable of uniquely identifying the piece of equipment 124 to which the tracking tag 126 is affixed. In some embodiments, the tracking tag includes a code affixed to the piece of equipment 124. The code may be a barcode or a sequence of symbols. In such embodiments, the operator other personnel may inspect the fire truck 100 and provide an indication that a particular piece of equipment 124 is present by, for example, entering the code into the user device 132. For example, a user may scan a barcode or manually input a code affixed a particular piece of equipment 124 and, by so doing, provide an input to the vehicle management system 120 via a secure connection established between the user device 132 and the vehicle management system 120. Such an input may include the code affixed to the piece of equipment 124. The code may be stored (e.g., in the vehicle database 220) in the vehicle management system 120 in association with the identity of the piece of equipment 124 such that, upon receipt of such an input, the vehicle management system 120 becomes aware that the piece of equipment 124 is present on the fire truck 100. The graphical interfaces presented to the operator via the display 122 may include an indication that the piece of equipment 124 is present on the fire truck 100.

In the exemplary embodiment shown, the tracking tag 126, rather than merely being a code affixed to the piece of equipment 124, includes a transmitter (not shown) that transmits a wireless signal having a product code encoded thereon. For example, the tracking tag 126 may include a radio-frequency identification (RFID) tag or an near-field communications (NFC) tag transmitting a radio frequency signal encoded with an equipment identification code ("ETD"). In another example, the tracking tag may include a Bluetooth® device that transmits a wireless signal including an EID.

In the example embodiment shown, the fire truck 100 further includes a detector 130 configured to receive the wireless signals emitted by the tracking tag 126 and relay the wireless signals to the vehicle management 120. In one embodiment, the detector 130 may include a wireless antenna that includes a wireless transceiver that both emits a wireless signal (e.g., to excite the tracking tags 126 in the event that passive tracking tags 126 are used) and receives the signals emitted by the tracking tags 126. While the exemplary embodiment shown in FIG. 1 only displays a single detector 130, it should be understood that the fire truck 100 may include a plurality of detectors 130 without departing from the scope of the present disclosure. For example, in one embodiment, the fire truck includes a plurality of detectors 130. Each detector 130 may be associated with a particular location of the fire truck 100 and may broadcast a wireless signal over a predetermined range (e.g., within a predetermined distance of within each detector 130). The wireless signals may be configured to activate the tracking tags 126 of various pieces of equipment 124 within the predetermined distance of the detector 130. Using such an arrangement, the vehicle management system 120, via methods described in greater detail below, may determine the relative location of various pieces of equipment 124 within the fire truck 100. Thus, misplaced equipment may be identified. In some embodiments, each detector 130 may be associated with a storage compartment 128. As such, the vehicle management system 120 may be aware of the pieces of equipment contained in each storage compartment 128.

The user device 132 is a device associated with a user. The user may include any individual having any sort of association with the fire truck 100. In one embodiment, the user is the operator of the fire truck. In various other embodiments, the user may include emergency response personnel (e.g., firefighters, management personnel, and the like), government inspectors, and the like. The user device 132 may include any type of device capable of establishing a connection and receiving information from the vehicle management system 120. As such, the user device 132 may include wearable devices such as a smart watch or a mobile computing device such as a smart phone, tablet, personal digital assistant, and laptop computing device. Alternatively, the user device 132 may include a stationary computing system such as a desktop computer located at the fire station associated with the fire truck 100.

Figure 2:
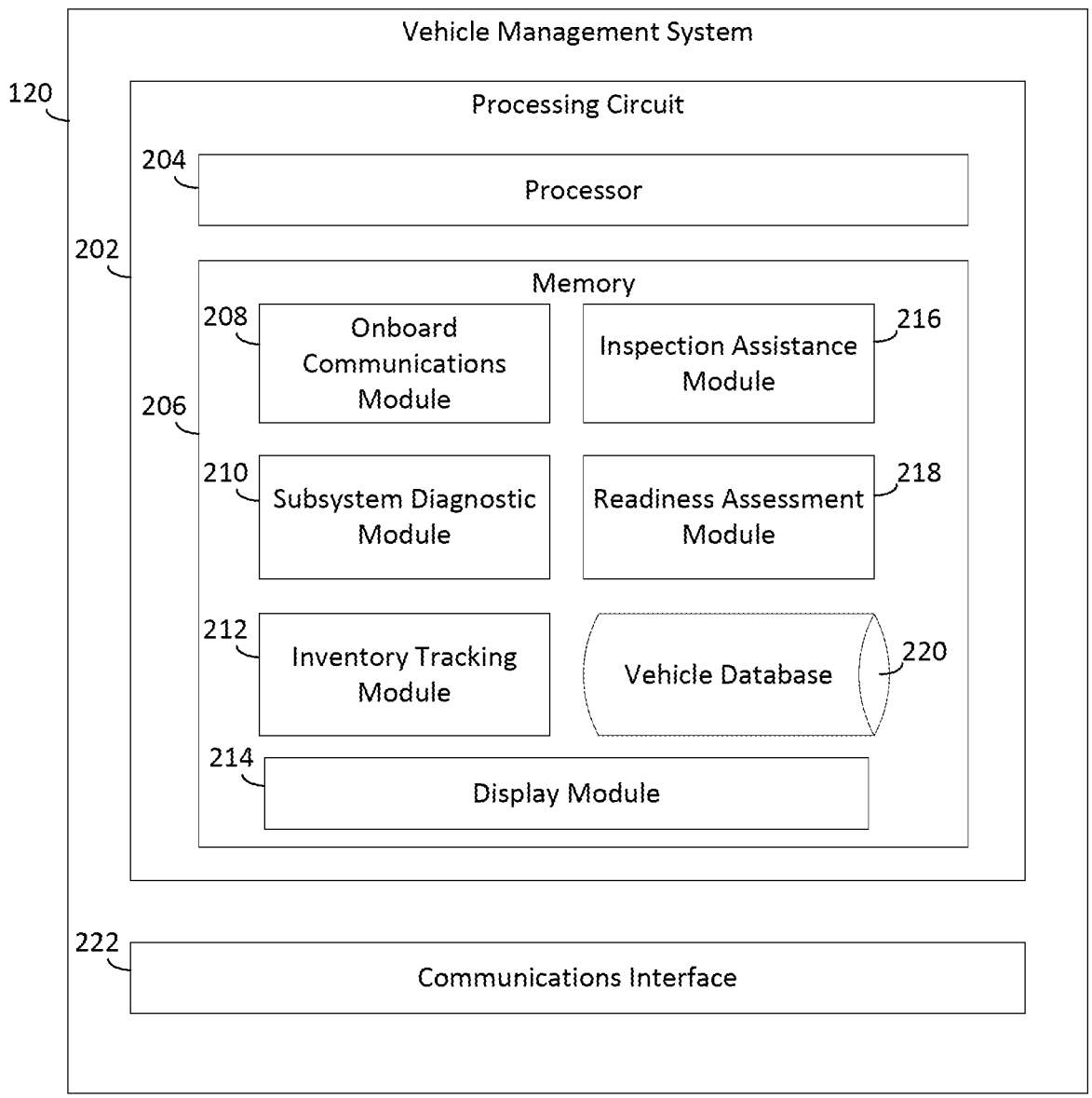
FIG. 2 is a block diagram of a vehicle management for a response vehicle, according to an exemplary embodiment.

Referring now to FIG. 2, a more detailed view of the vehicle management system 120 of the fire truck 100 of FIG. 1 is shown according to an exemplary embodiment. The vehicle management system 120 includes a processing circuit 202 including a processor 204 and a memory 206. Processor 204 may be a general purpose or specific purpose processor, an application specific integrated circuit (ASIC), one or more field programmable gate arrays (FPGAs), a group of processing components, or other suitable processing components. Processor 204 may be configured to execute computer code or instructions stored in memory 206 or received from other computer readable media (e.g., CDROM, network storage, a remote server, etc.) to perform one or more of the processes described herein. Memory 206 may include one or more data storage devices (e.g., memory units, memory devices, computer-readable storage media, etc.) configured to store data, computer code, executable instructions, or other forms of computer-readable information. Memory 206 may include random access memory (RAM), read-only memory (ROM), hard drive storage, temporary storage, non-volatile memory, flash memory, optical memory, or any other suitable memory for storing software objects and/or computer instructions. Memory 206 may include database components, object code components, script components, or any other type of information structure for supporting the various activities and information structures described in the present disclosure. Memory 206 may be communicably connected to processor 204 via processing circuit 202 and may include computer code for executing (e.g., by processor 204, etc.) one or more of the processes described herein.

The memory 206 is described below as including various modules. While the exemplary embodiment shown in the figures shows each of the modules 208-218 as being separate from one another, it should be understood that, in various other embodiments, the memory may include more, less, or altogether different modules. For example, the structures and functions of one module may be performed by another module, or the activities of two modules may be combined such that they are performed by only a signal module.

As shown in FIG. 2, the memory 206 includes an onboard communications module 208. Onboard communications module 208 is configured to facilitate wireless communications with user devices and with other vehicles via communications interface 222 (e.g., a transceiver, etc.). Communications interface 222 may support any kind of wireless standard (e.g., 802.11 b/g/n, 802.11a, etc.) and may interface with any type of mobile device (e.g., laptop, tablet, smartphone, etc.) having Wi-Fi capability. Communications interface 222 may further facilitate wireless communications with an external global positioning system (GPS). Onboard communications module 208 may be any type of Wi-Fi capable module (e.g., a CL-T04 CANect® Wi-Fi Module manufactured by HED Inc., etc.) configured to support wireless communications with the mobile devices and other response vehicles. In one embodiment, the user devices communicate with the response vehicles via Wi-Fi. In other embodiments, the communications between the user devices and/or response vehicles may be supported via CDMA, GSM, or another cellular connection. In still other embodiments, another wireless protocol is utilized (e.g., Bluetooth, Zigbee, radio, etc.).

Onboard communications module 208 may include various security features for providing secure communications between the vehicle management system 120 and user devices 132. Such a module may further include other response vehicle-related features that may be used in the systems and methods disclosed herein (e.g., diagnostics features, navigation features, etc.). For more detail regarding the onboard communications module, see co-pending U.S. patent application Ser. No. 15/097,278 entitled "Response Vehicle Systems and Methods," hereby incorporated by reference in its entirety.

In the example embodiment shown, the vehicle management system 120 establishes a connection with the user device 132 via the communications interface 222 as controlled by the onboard communications module 208. For example, the user may approach the fire truck 100 with the user device 132. The user device 132 may pick up a wireless signal broadcasted by the communications interface 222. In response, the user may provide an input to the user device 132 to establish a connection to the vehicle management system 120 by inputting credentials (e.g., a password or the like) in the user device 132. In response to receiving such an input, the onboard communications module 208 may cause the processor 204 of the vehicle management system 120 to authenticate the user by comparing the input credentials to credentials stored in the vehicle management system 120 (e.g., in the vehicle database 220). Having authenticated the user, various encryption keys and the like may be exchanged between the user device 132 and the vehicle management system 120 to establish a secure connection between the vehicle management system 120 and the user device 132. Such a connection may support any of the communications between the user device 132 and the vehicle management system 120 described herein. For example, various display datasets in the form of webpages may be transmitted by the vehicle management system 120 to the user device 132 such that the datasets are viewable via a web browser on the user device 132. Such webpages may enable the user to provider various inputs to the vehicle management system such as inputs relating to the inspection of various pieces of equipment 124, as described below.

As shown in FIG. 2, the memory 206 includes a subsystem diagnostic module 210. Subsystem diagnostics module 210 is structured to enable the processor 204 of the vehicle management system 120 to interface with various vehicle subsystem controllers 112-118 of the fire truck 100. In the exemplary embodiment shown, the vehicle management system 120, via the subsystems diagnostic module 210, may generate a vehicle subsystem report based on various sensor signals received from the subsystem controllers 112-118. The report may be generated by comparing the sensor signals received from the vehicle subsystem controllers 112-118 to a series of baseline sensor values. For example, a baseline sensor value for the pump control system 116 may include a threshold water level that is necessary for the fire truck to respond to any fire incident. Thus, upon receipt of a sensor signal indicative of the water and/or agent level in the water/agent tank 106, the processor 204 may compare the received signal to the baseline value to determine the operational status of the water/agent tank 106. The generated report may indicate whether the measured water level and/or the measured agent level of the water/agent tank 106 is above or below the baseline value. As will be understood, there may be multiple baseline values with respect to each sensor of the vehicle subsystem controllers 112-118. A similar process may be repeated for each subsystem controller 112-118 to generate report indicating the status of each operational aspect of the fire truck 100 measured by the vehicle subsystem controllers 112-118.

The subsystem diagnostic module 210 may be structured to interface with various other modules to present the vehicle subsystems report to an operator and/or other user. For example, the diagnostics module 210 may interface with the display module 214 to present the operator with the vehicle subsystem report via the display 122. The display module 214 may be configured to present the generated vehicle subsystems report on the display 122. Alternatively or additionally, the subsystem diagnostic module 210 may interface with the onboard communications module 208 so as to format the generated vehicle subsystem report into a webpage or the like that is viewable on the user device 132 and transmit the report data to the user device 132 via the secure connection discussed above.

As shown in FIG. 2, the memory 206 further includes an inventory tracking module 212 configured to track the equipment 124 disposed at or proximate to the fire truck 100. For example, based on the wireless signals received from the tracking tags 126 affixed to the equipment 124, the inventory tracking module 212 may identify all of the pieces of equipment 124 within a predetermined distance of the fire truck 100. For example, the inventory tracking module 212 may generate a list of the pieces of equipment 124 within the predetermined distance of the vehicle by accessing a lookup table including various EIDs associated with various pieces of equipment 124 that the municipality or fire department associated with the fire truck 100 has deemed necessary for the fire truck. The lookup table may match the EIDs with various equipment descriptions. Using the lookup tables, a report of present equipment 124 may be presented to the operator and/or other user via methods similar to those discussed above in relation to the vehicle subsystem report. If a required piece of equipment 124 is found to not be within the predetermined distance of the fire truck 100, for example, the report may identify the missing piece of equipment. A more detailed explanation of the inventory tracking module 212 will be discussed below in relation to FIG. 3.

As shown in FIG. 2, the memory 206 further includes a display module 214. The display module 214 is structured to cause the processor 204 to generate various displays for viewing by the display 122. In the example embodiments shown, the displays presented via the display 122 may vary depending on various inputs received from the operator or other user. For example, the display module 214 may include a menu navigation module (not shown). The menu navigation module may present the operator with a menu interface presenting various options to the operator. Each option may include a selectable widget configured to cause the display module 214 to generate and/or retrieve a particular display in response to the operator's selection of the widget (e.g., by the operator touching the screen of the display 122 in a position that corresponds to a particular widget). For example, the menu interface may include a vehicle subsystem widget, an inventory widget, and a vehicle readiness widget. In response to the operator selecting the subsystem widget, the display module 214 may cause the processor 206 to provide the vehicle subsystem report discussed above on the display 122. While display module 214 is described with reference to the fire truck 100 in FIG. 2, it should be understood that display module 214 may provide the same or a similar type of interface, with the same, similar, or different types of features (e.g., touchscreen input capability, etc.) to the user devices 132 as well.

In some embodiments, the display module 214 may generate and/or retrieve various displays for presentation via the display 122 in response to receiving various other inputs. For example, if the subsystem diagnostic module 210 determines that a particular subsystem 102-110 is operating sub-optimally in at least one respect (e.g., the tire pressure is below a threshold, the water level and/or the agent level in the water/agent tank 106 is below a threshold, a lighting system is failing to emit light, etc.), the display module 214 may generate a subsystem alert that identifies the sub-optimal subsystem 102-110 and the fault of the subsystem 102-110 (e.g., the display 122 may present a message indicating that the braking system is malfunctioning).

As shown in FIG. 2, the memory 206 further includes an inspection assistance module 216. The inspection assistance module 216 is configured to facilitate an inspection by a user of various aspects of the fire truck 100 via a secure connection established between the user device 132 and the vehicle management system 120. In this regard, the inspection assistance module 216 may interface with the display module 214 to transmit various display datasets to the user device 132 via the secure connection. Such display datasets may, for example, identify a plurality of inspection points of the fire truck 100 and list a plurality of pieces of equipment 124 at each inspection point to be inspected by the user. Further, such display datasets may enable the user to provide various inputs indicative of the condition of each of the pieces of equipment 124 inspected by the user. Further, the inspection assistance module 216 may cause the processor 204 to compile all such inputs into an inspection report that may be stored in the vehicle management system (e.g., in the vehicle database 220) and/or presented via the display 122. Inspection assistance module 216 is described in greater detail below with reference to FIG. 6.

As shown in FIG. 2, the memory 206 further includes a readiness assessment module 218. The readiness assessment module 218 is configured to assess overall response readiness of the fire truck 100. In this regard, the readiness assessment module 218 is structured to cause the processor 204 to identify various faults of the fire truck 100 based on various inputs. Such inputs may be received from the reports generated by the subsystem diagnostic module 210 and the inventory tracking module 212. For example, if a report generated by the subsystem diagnostic module 210 indicates that the engine 104 is sub-optimal in at least one respect (e.g., the oil level is below a threshold), the readiness assessment module 218 may cause the processor 204 to identify that as a defect. Additionally, such inputs may also be received from the user device 132. For example, if the user inspects a particular piece of equipment 124, identifies a defect associated therewith (e.g., a compressed air cylinder has a cracked gage) and provides an input indicating as much via the displays presented via the inspection assistance module 216, the readiness assessment module 218 may cause the processor 204 to identify an inventory defect.

Having identified various defects (e.g., in the operation of various vehicle subsystems 102-110, in various pieces of equipment 124, or in other aspects of the fire truck 100), the readiness assessment module 218 further causes the processor to assign a readiness reduction score for each defect and to determine the overall emergency readiness of the fire truck 100 based on the assigned scores. Various alerts may be presented to the operator and/or other user if the readiness of the fire truck 100 falls below a threshold. Readiness assessment module is described in greater detail below with respect to FIG. 7.

In some embodiments, the vehicle management system 120 further includes a call reporting module (not shown). The call reporting module is configured to receive information pertaining to the fire truck 100's response to a service call. For example, upon receiving an emergency call, a manager or the like may transmit a dispatch call to the fire truck 100 via a user device 132. The dispatch call may identify a type of call (e.g., the type of scene that requires the fire truck 100), a response address, and a dispatch time. Upon receipt of a dispatch call, the reporting module may configure the processor 204 to generate a run sheet entry for the dispatch call. The run sheet entry may include a report having various entries describing the call such as, the time that the vehicle was dispatched, the time the fire truck 100 was on scene, the mileage of the truck driven, the number of personnel on the fire truck 100, whether the pump 108 was engaged, the response address, and the type of dispatch call. The call reporting module is structured to cause the processor 204 to gather the information associated with the entries in the run sheet. For example, certain information may be gathered from the dispatch call received from the user device 132. Other information, such as the timing of the end of the call, the mileage driven, and the engagement status of the pump 108 may be determined based on the outputs of various vehicle subsystem controllers 112-118. For example, the call reporting module may interface with an odometer of the fire truck 100 to determine the miles driven. Additionally, the call reporting module may interface with the pump control system 116 to determine if the pump is engaged during the call. Other information may be manually input by the operator via the display 122. Various completed run sheets may then be stored in the vehicle database 220, thus enabling the fire truck 100's utilization to be accurately monitored.

As shown in FIG. 2, memory 206 also includes a vehicle database 220 configured to store various forms of information pertaining to the fire truck 100. The vehicle database may include, for example, telemetric data captured by various vehicle subsystem controllers 112-118. For example, the subsystem diagnostic module 210 may include a data logger or the like that stores any sensor signals received from the subsystem controllers 112-118. The vehicle database 220 may include a plurality of telemetry datasets, with each dataset corresponding to a different sensor device of each vehicle subsystem controller 112-118. Each dataset may include a plurality of entries, with each entry including a sensor signal value and a time stamp. Alternatively or additionally, the vehicle database 220 may store the vehicle subsystem reports generated via the subsystem diagnostic module 210.

Additionally, the vehicle database 220 may store information gathered via the inventory tracking module 212, the inspection assistance module 216, and the readiness assessment module 218. For example, each time the inventory tracking module 212 generates a report listing the various pieces of equipment 124 within a predetermined distance of the fire truck 100 at a particular point in time, the report may be retrievably stored in the vehicle database 220. Similarly, whenever a user provides an inspection input to the vehicle management system 120 (e.g., by selecting a defect of a particular piece of equipment 124 on a display on the user device 132), the input may be stored in an inspection dataset maintained by the vehicle database 220. The inspection dataset may include a plurality of entries with each entry including an inspection point, an EID, a listing of the defect found to be present by the user, and a time stamp. By accessing such data, a fire department or municipality associated with the fire truck 100 is able to track the status of various historical defects. The department may gain insights as to the responsiveness with which various defects of the fire truck 100 are addressed.

In some embodiments, the vehicle database 220 also includes electronic versions of various manuals associated with the fire truck 100. For example, the vehicle database 220 may include digital versions of an operator manual of the fire truck 100. The operator manual may include descriptions of various components of the fire truck 100. The operator manual may be stored in a format such that it is presentable to the operator via the display 122. The vehicle management system 120 may further include a searching algorithm enabling in the operator to selectively retrieve various portions of the operator manual (e.g., pertaining to specific vehicle subsystems 102-110). Alternatively or additionally, the operator manual may be stored such that it is transmittable via the communications interface 222 to various external computing systems (e.g., the user device 132). This way, other users of the fire truck may interface with the operator manual.

Additionally, the vehicle database 220 may also include a service manual associated with the fire truck 100. The service manual may include a listing of various parts of the fire truck 100 and include instructions pertaining to repairing various components of the fire truck 100. As with the operator manual discussed above, the service manual may be searchable and transmitted for view via the display 122. In some arrangements, users (e.g., service technicians or the like) may interact with the service manual to order various parts for repairing the fire truck 100. For example, upon a particular vehicle subsystem 102-110 malfunctioning (e.g., as determined by the subsystem diagnostics module 210), the user may be brought to a service manual display associated with the vehicle subsystem 102-110 automatically by the vehicle management system 120. The service manual display may identify various parts associated with the identified vehicle subsystem 102-110. The service manual display may be configured to receive various inputs from the user. For example, the user may select various parts and further select an "order" or "add to cart" button to send an order request to a pre-identified vendor. Thus technicians are able to efficiently order parts via the systems and methods disclosed herein.

In some embodiments, the vehicle database 220 further includes information pertaining to a plurality of subscribers of the fire truck 100. Each subscriber may be a person authorized to access the vehicle management system 120 (e.g., an operator, a commander, a service technician, a representative from the manufacturer of the fire truck). Subscriber information may include, for example, authentication credentials (e.g., a username, password, and the like used to enable the subscriber to establish a secure connection with the fire truck 100 via a user device 132), various subscriber-set thresholds described herein (e.g., subscribers may set thresholds relating to sensor data captured by vehicle subsystem controllers 112-118), and various readiness reduction score thresholds described below to receive alerts when the fire truck meets the thresholds, and subscriber device identifying information (e.g., an IP address associated with a user device 132). Vehicle subscribers may be sent periodic updates regarding the status of the fire truck 100.

The data may be removed from the vehicle database 220 once the data is uploaded to a remote cloud storage. For example, long-term storage of the telemetry data and other data may be done on a centralized server, and communications interface 222 may wirelessly connect with a remote server to transmit and store the data. The data includes a timestamp and vehicle identifier information to identify the data in remote server.

In one embodiment, the data is automatically updated periodically. The data may also be updated upon user request. A controller area network (CAN) controller, such as subsystems diagnostics module 210 or another module may be configured to monitor the data and to determine when a potential status of the fire truck has changed based on the telemetry data changes.

Vehicle database 220 may be any type of database (e.g., a SQLite database, etc.), and modules 208-218 may query the database using any type of language or method via backend framework. The backend framework of vehicle management system 120 may support the activities of periodically updating and querying vehicle database 220, as well as providing web layer authentication (e.g., to authenticate devices that attempt to access data from vehicle database 220, etc.). The backend framework may further support the various security-related functionality of onboard communications module 208.

Vehicle management system 120 may include, for example, a data transport protocol layer configured to facilitate the query of data from vehicle database 220 for use by the various modules of memory 206. In one embodiment, at least one of web sockets and AJAX polling is used to invoke queries via backend framework and provide the data to the frontend applications (e.g., the application layer, the modules, etc.), as they allow changes to database 220 to be detected and pushed to the application layer. The use of web sockets and/or AJAX may be based on compatibility constraints and performance constraints with the user devices 132 accessing vehicle management system 120. The application layer, or the frontend application, of vehicle management system 120 may be built using, for example, HTML5, CSS, and various Javascript libraries.

Figure 3:
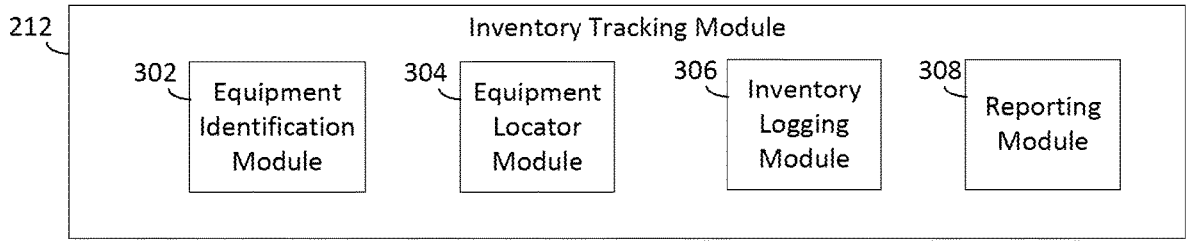
FIG. 3 is a detailed block diagram of an inventory tracking module of the vehicle management system, according to an exemplary embodiment.

Referring now to FIG. 3, inventory tracking module 212 of the vehicle management system 120 is described in greater detail. Inventory tracking module 212 may receive data regarding various pieces of equipment 124 on the fire truck 100, identify various pieces of equipment 124 within a predetermined distance of the fire truck 100 based on the received signals, and provide inventory information for display on the display 122 or via the user device 132. While inventory tracking module 212 is shown as a standalone module in FIG. 3, in other embodiments, the various activities described in diagnostics module 210 may be carried out by other modules and systems of the vehicle management system 120 of the fire truck 100.

As shown in FIG. 3, the inventory tracking module 212 includes an equipment identification module 302. The equipment identification module 302 is structured to cause the processor 206 to receive vehicle inventory data. Vehicle inventory data may include, for example, signals received by the detector 130 from various tracking tags 126 affixed to various pieces of equipment 124 on the fire truck 100. Alternatively or additionally, vehicle inventory may also include inputs received from the user device 132. For example, after establishing a secure connection with the vehicle management system 220 via the methods discussed above, the user may scan a barcode affixed to a piece of equipment 124, thereby providing an input to the vehicle management system 120 indicating the presence of the piece of equipment 124. As discussed above, vehicle inventory data may include various EIDs associated with various pieces of equipment 124. Thus, upon receipt of vehicle inventory data, pieces of equipment 124 present on the fire truck 100 may be identified via accessing a lookup table. An inventory logging module 306 may be configured to log the fire truck 100's inventory of equipment at various points in time. For example, once an equipment list for a particular point in time is generated, the list may be stored in the vehicle database 220 in association with that point in time.

In some embodiments, the inventory tracking module 212 further includes an equipment locator module 304. The equipment locator module 304 is configured to determine the relative location of various pieces of equipment 124 within the fire truck. The methods through which the relative location is determined may vary depending upon the implementation of the detector 130. As discussed above, in some embodiments, the fire truck 100 includes a plurality of detectors 130 configured to receive wireless signals emitted by tracking tags 126 affixed to various pieces of equipment 124 within a predetermined distance. Thus, the equipment locator module 304 configures the processor 204 to identify the relative location of a particular piece of equipment 124 by determining which detector 130 received the wireless signal emitted by the tracking tag 126 associated with that piece of equipment 124. For example, upon detection of a wireless signal from a tracking tag 126, the detector 130 may relay a notification signal to the vehicle management system 120. The notification signal may include the EID encoded in the signal received from the tracking tag 126 as well as a detector identifier. Each detector identifier may be stored in association with a particular location of the fire truck 100 (e.g., in association with a particular storage compartment 128). Thus, the equipment locator module 304 may further configure the processor 206 to access another lookup table to determine the relative location of a particular piece of equipment.

A reporting module 308 may be provided to generate a report relating to the equipment inventory of the response vehicle. The report may identify the various pieces of equipment 124 that were detected to be on the fire truck 100, as well as catalog the relative location of each detected piece of equipment 124. Additionally, the reporting module 308 may format the report for presentation to various personnel. For example, the reporting module 308 may format the equipment list generated by the equipment identification module 302 for display on a webpage on a browser of the user device 132. Communications interface 222 may then transmit the equipment list wirelessly to the user device 132 for viewing by the user. Alternatively or additionally, the report may be presented via the display 122 responsive to the operator providing an input indicative of a preference to view the report.

Figure 4:
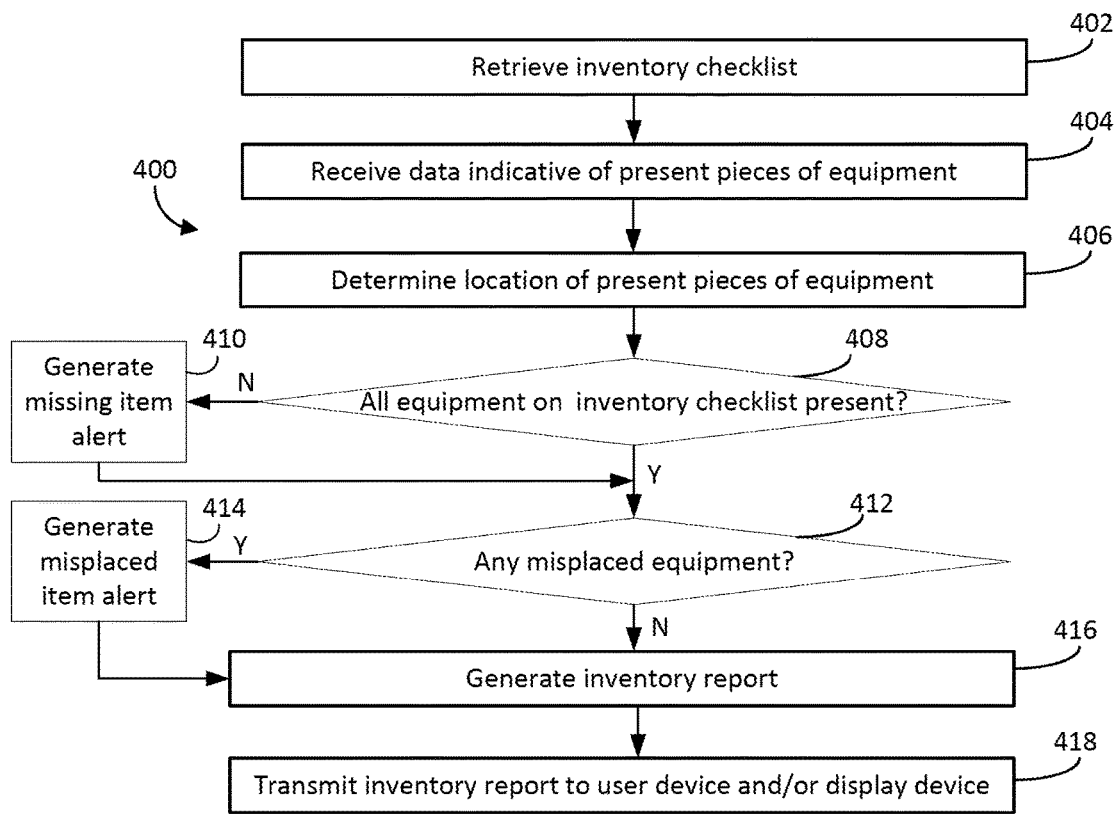
FIG. 4 is a flow chart of a process for tracking the inventory of various equipment stored on the response vehicle, according to an exemplary embodiment.

Referring now to FIG. 4, a flow chart of a process 400 for providing inventory information to a user is shown, according to an exemplary embodiment. Process 400 may be executed by, for example, the inventory tracking module 212. Process 400 may be executed to provide inventory information to a commander prior to dispatching the fire truck 100 on a service call. For example, the commander may receive inventory information from various fire trucks 100 at the station and may use the inventory information to decide which vehicle to dispatch on a service call.

Process 400 includes retrieving an inventory checklist (block 802). For example, a department or municipality associated with the fire apparatus may set standards or guidelines describing the various pieces of equipment 124 that must be present on a fire truck 100 in order for the fire truck to be dispatched. Such guidelines may be stored, for example, in the vehicle database 220 of the vehicle management system 120. Alternatively, an inventory checklist may be generated based on past inventory data captured via the inventory tracking module 212. For example, the inventory tracking module 212 may cause the processor 206 to retrieve the last inventory list for the fire truck 100 captured via the inventory tracking module 212.

Process 400 includes receiving data indicative of present pieces of equipment 124 (block 404). In one embodiment, a detector 130 (or a plurality thereof) of the fire truck 100 captures a series of wireless signals transmitted by various tracking tags 126 affixed to various pieces of equipment 124 on the fire truck 100. Upon the detection of a particular wireless signal from a tracking tag 126 affixed to a particular piece of equipment 124, the detector 130 relays a notification signal to the vehicle management system 120. The notification signal may include an EID associated with the piece of equipment 124.

Process 400 further includes determining the location of present pieces of equipment (block 406). As discussed above, the relative location of a particular piece of equipment 124 may be identified based on the particular detector 130 that detected the piece of equipment 124. Alternatively, the relative location of each piece of equipment 124 may be determined based on the strength of the signal received from the tracking tag 126 by the detector 130. For example, the detector 130 may also measure the intensity of the wireless signals received from the tracking tags 126. The equipment locator module 304 may further include a lookup table that maps various intensity values with various distances from the detector 130. Accordingly, by measuring the intensity of the wireless signals received from the tracking tags 126, the distance of the pieces of equipment 124 from the detector 130 may be determined. If multiple detectors 130 capture the wireless signals emitted by the tracking tags 126, then the location of the all of the pieces of equipment 124 may be determined by way of triangulation.

Process 400 further includes determining of all items on the retrieved inventory checklist are present (block 408). A list of pieces of equipment 124 present on the fire truck 100 may be generated based on the data received at 404. For example, a lookup table included in the inventory tracking module 212 may be accessed to identify the present pieces of equipment 124 based on the EIDs included in the signals received from the detector 130. The generated list may then be compared to the inventory checklist retrieved at 402 to determine if any pieces of equipment 124 are missing from the fire truck 100. If pieces of equipment 124 are missing, a missing item alert is generated (block 410). For example, a description of the missing piece of equipment 124 as well as any desired location for the missing item may be identified based on the inventory checklist retrieved at 402. Upon the generation of the alert, the display module 214 may present the alert to the operator via the display 122. Alternatively, the alert may be transmitted to the user device 132 for presentation to the user.

Process 400 further includes determining if any equipment is misplaced (block 412). For example, the relative location of each identified present piece of equipment 124 may be compared to suggested locations included on the retrieved inventory checklist. If a mismatch is found, a misplaced item alert may be generated (block 414). The alert may describe the misplaced piece of equipment 124 and identify the nature of the displacement. For example, the misplaced piece of equipment 124 may be currently located in the improper storage compartment 128. Accordingly, the alert may identify the current location of the misplaced equipment and the suggested location for the misplaced equipment.

Process 400 further includes generating an inventory report (block 416). The inventory report may identify the equipment 124 present on the fire truck 100 and include the locations of the present equipment 124. The report may also identify any missing equipment and any unnecessary equipment present on the fire truck 100. For example, piece of equipment 124 meant to be stored on fire trucks other than the fire truck 100 may be inadvertently placed in the fire truck 100. Once generated, the report is transmitted to the user device 132 and/or display 122. Thus, various personnel may be notified of the status of the various pieces of equipment 124 at or near the fire truck 100.

Figure 5:
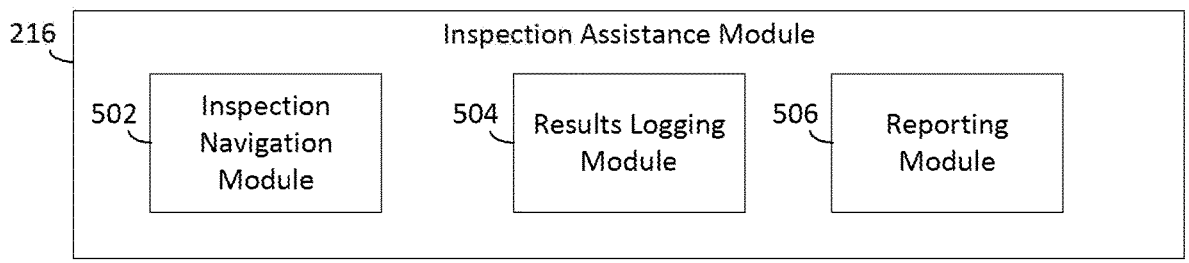
FIG. 5 is a detailed block diagram of an inspection assistance module of the vehicle management system, according to an exemplary embodiment.

Referring now to FIG. 5, inspection assistance module 216 of vehicle management system 120 is described in greater detail. Inspection assistance module 216 may transmit various display datasets to a user device 132 in order to provide assistance to a user in inspecting the fire truck 100 and various pieces of equipment 124 located thereon. Further, the inspection assistance module 216 may receive various inputs from the user device 132 indicative of the condition of various components of the fire truck 100. While inspection assistance module 216 is shown as a standalone module in FIG. 5, in other embodiments, the various activities described regarding the inspection assistance module 216 may be carried out by other modules and systems of the vehicle management system 120 of the fire truck 100.

Inspection assistance module 216 may be configured to present a user with various displays configured to assist the user in performing an inspection of the fire truck 100. As shown in FIG. 5, inspection assistance module 216 includes an inspection navigation module 502 configured to transmit various inspection instruction datasets to the user device 132 via the secure connection discussed above established via the onboard communications module 208. The inspection assistance module 216 may selectively retrieve the inspection instruction datasets from the vehicle database 220 based on various inputs from the user device 132 described below. Such inspection instruction datasets may be formatted as webpages such that, upon receipt by the user device 132, various inspection instruction interfaces are presented to the user. One inspection interface may identify a plurality of inspection points of the fire truck 100. Inspection points may identify various aspects of the fire truck that must be inspected. Example inspection points include a windshield of the fire truck, tires of the fire truck 100, various vehicle subsystems 102-110, storage compartments 128 and associated pieces of equipment 124, and various other aspects of the fire truck 100.

Additionally, the user may interact with the inspection interface to provide various inputs to the vehicle management system 120. For example, upon the user's selection of a particular inspection point of the fire truck 100, the inspection navigation module 502 may cause the processor 204 of the vehicle management system 120 to retrieve an equipment inventory checklist associated with the inspection point from the vehicle database 220. The inventory checklist may identify various pieces of equipment that should be present at the inspection point, or have been measured to be present at the inspection point (e.g. by the method 400 discussed above). Further, upon the user selecting a particular piece of equipment 124 from the checklist, another inspection interface stored in association with the selected piece of equipment may be retrieved from the vehicle database 220. The retrieved interface may instruct the user to provide various inputs as to the condition of the selected piece of equipment. For example, if the selected piece of equipment 124 is a compressed air cylinder, the interface may instruct the user to provide inputs regarding the condition of a pressure gage of the cylinder (e.g., indicate whether the gage is cracked, provide an input as to the general outward appearance of a release valve, etc.).

The inspection assistance module 216 further includes a results logging module 504. As the user navigates through the fire truck 100 to various inspection points and inspects various pieces of equipment 124, the user provides various inputs indicating the condition of the fire truck 100 and the pieces of equipment 124. The results logging module 504 is configured to store these inputs in the vehicle database 220 as they are received from the user device 132.

A reporting module 506 may compile the various inputs received from the user device 132 in the inspection process described above into an inspection report. The inspection report may identify the various pieces of equipment 124 located by the user and identify the condition of the identified pieces of equipment based on the inputs provided by the user. The report may be transmitted by the vehicle management system 120 to various other computing devices such that various personnel (e.g., a commander or department manager) may be aware of the general condition of the vehicle as determined by the user.

Figure 6:
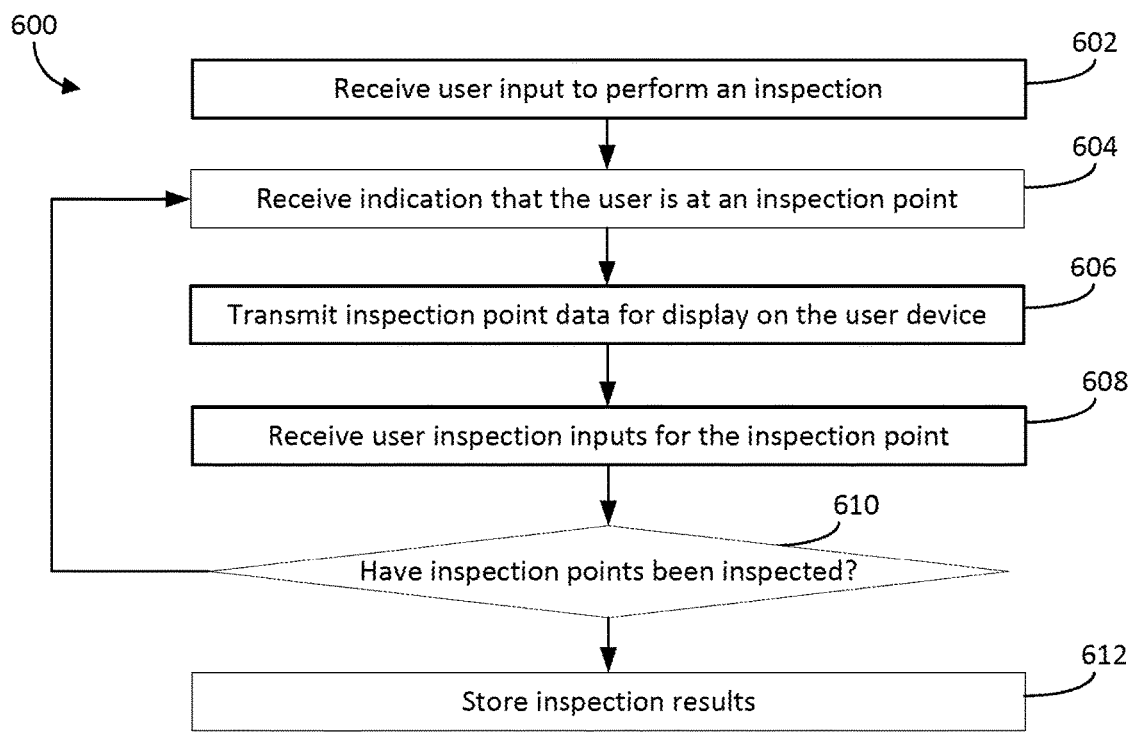
FIG. 6 is a flow chart of a process for assisting in the inspection of a response vehicle, according to an exemplary embodiment.

Referring now to FIG. 6, a flow chart of a process 600 for assisting a user in inspecting a response vehicle is shown, according to an exemplary embodiment. Process 600 may be executed by, for example, the inspection assistance module 216. Process 600 may be executed to provide the results of an inspection to a manager or other personnel remote from the vehicle. For example, a commander may receive inspection reports pertaining to various fire trucks 100 associated with a particular station, and may manage the use of the fire trucks based on the reports.

Process 600 includes receiving a user input to perform an inspection (block 602). For example, a user such as a city inspector or the like may bring a user device 132 within the communication range of the vehicle management system 120 such that the user device 132 receives a wireless signal broadcasted by the communications interface 222. The user may request to connect the vehicle management system 120, provide authentication credentials, and establish a connection to the vehicle management system 120. In response, the vehicle management system 120 may transmit a main menu interface in the form of a webpage to the user device 132. The main menu interface may present the user with various options. For example, the main menu interface may enable the user to view the subsystem diagnostic reports generated via the subsystem diagnostic module 210, the inventory reports generated via the inventory tracking module 212, or the perform an inspection of the fire truck 100. The user may select the inspection option, thereby causing the vehicle management system 120 to receive the user input to perform an inspection.

Process 600 includes receiving an indication that the user is at an inspection point (block 604). For example, after receiving the user input to perform an inspection, the inspection assistance module 216 may cause the processor 204 to retrieve an initial inspection instruction dataset from the vehicle database 220 and to transmit the dataset to the user device 132 via the secure connection. The initial inspection instruction dataset may be formatted as a webpage, and present the user with various inspection points of the fire truck. Upon arriving at an inspection point (e.g., the windshield of the fire truck), the user may select the inspection point to provide an indication that the user wishes to inspect that inspection point.

Process 600 includes transmitting inspection point data to the user device (block 606) and receiving various inspection inputs from the user (block 608). For example, once the user selects a particular inspection point the inspection assistance module 216 may cause the processor 204 to retrieve an equipment inventory list stored in association with that inspection point from the vehicle database 220. The inventory list may identify various aspects of the inspection point (e.g., components of the fire truck 100 itself, various pieces of equipment 124 at the inspection point, etc.). The user may select an aspect of the inspection point, thereby causing another inspection instruction dataset to be retrieved and transmitted to the user device 132. This dataset may present the user with instructions regarding the selected aspect of the inspection point. Turning back to the windshield example, an inspection instruction dataset associated with the windshield may include a dropdown menu identifying various potential defects of the windshield (e.g., cracks, chips, and the like). Thus, the user may select a piece of equipment 124, provide various inputs regarding the condition of the selected piece of equipment 124, and repeat this process until all of the aspects of the inspection point identified by the equipment inventory list associated with the inspection point have been assessed by the user.

Process 600 further includes determining if the user has completed all of the inspection points (block 610). Once the user completes blocks 604-606 for a particular inspection point, the user may be brought to another interface identifying the inspection points of the fire truck that the user is yet to inspect. The user may arrive at another inspection point, and repeat blocks 604-606 until all of the inspection points for the fire truck 100 have been completed.

Process 600 further includes storing the inspection results 612. For example, after the user has inspected each piece of equipment 124 of the fire truck 100 the processor 204 may execute the reporting module 506 discussed above to generate an inspection report, and store the inspection report in the vehicle database 220. As such, the inspection report is conveniently accessible for later retrieval.

Figure 7:
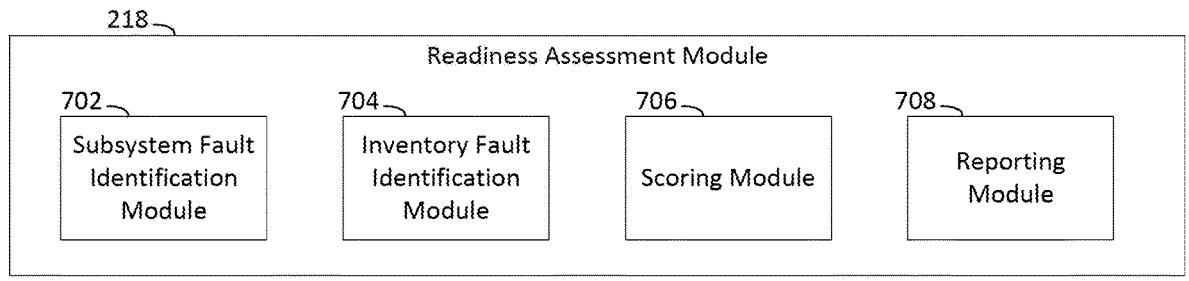
FIG. 7 is a detailed block diagram of a readiness assessment module of the vehicle management system, according to an exemplary embodiment.

Referring now to FIG. 7, readiness assessment module 218 of vehicle management system 120 is described in greater detail. Readiness assessment module 218 is configured to interface with various other modules (e.g., the subsystem diagnostic module 210, the inventory tracking module 212, and the inspection assistance module 216) to provide real time assessments of a response vehicle's current state of readiness to respond to a particular situation. In one embodiment, the readiness assessment module 218 is a standalone module. In other embodiments, may be integrated with any of the other modules described herein. For example, in one embodiment each of the subsystem diagnostic module 210, the inventory tracking module 212, and the inspection assistance module 216 includes a readiness assessment module specifically configured to perform the various operations described below.

As shown in FIG. 7, readiness assessment module 218 includes a subsystem fault identification module 702. The subsystem fault identification module 702 is configured to identify various faults in vehicle subsystems 102-110. In this regard, the subsystem fault identification module 702 may interface with the subsystem diagnostics module 210 so as to receive data gathered by various vehicle subsystem controllers 112-118. Additionally, subsystem fault identification module 702 may receive the results of the various comparisons performed by the subsystems diagnostics module 210 discussed above to identify various subsystem faults. For example if subsystem diagnostics module 210 receives a signal from a tire pressure subsystem controller and determines that a tire of the fire apparatus has an air pressure below a predetermined threshold, the subsystem fault identification module 702 may identify that as a vehicle subsystem fault.

Additionally, the subsystem fault identification module 702 may further assess historical vehicle subsystem data stored in the vehicle database 220 to determine if any trends in the data captured by the various vehicle subsystem controllers 112-118 are indicative of any vehicle subsystem faults. For example, the subsystem fault identification module 702 may cause the processor 204 to retrieve historical water and/or agent level measurements captured by a sensor associated with the water/agent tank 106. If there is a steady decline in the measurements without the water and/or agent being discharged by the pump system 108, for example, this may be a result in a leak in the water/agent tank 106. Thus, even if the subsystem diagnostic module 210 fails to identify a fault in a vehicle subsystem 102-110 (e.g., because the sensor value maintains a proper relationship with a predetermined threshold), the subsystem fault identification module 702 may identify subsystem faults based on various trends in the sensor signal values stored in the vehicle database 220.

Additionally, subsystem fault identification module 702 may further receive various inputs provided by the user during the inspections discussed above to identify other vehicle subsystem faults. For example, the user may inspect a vehicle subsystem 102-110 as instructed by the inspection assistance module 216, identify a fault (e.g., a damaged exterior), and provide an input identifying the fault via the inspection interfaces discussed above. Upon receipt of the input by the vehicle management system 120, the subsystem fault identification module 702 may identify the fault based on the input.

As shown in FIG. 7, the readiness assessment module 218 further includes an inventory fault identification module 704 configured to identify various deficiencies in the equipment 124 present on the fire truck 100. In this regard, the inventory fault identification module 704 is configured to receive the reports generated by the inventory tracking module 212 identifying pieces of equipment 124 that are missing from the fire truck 100. Alternatively or additionally, the inventory fault identification module 704 may perform similar functions as discussed above with respect to the inventory tracking module 212 (e.g., receive identification signals from the detector 130, identify present pieces of equipment 124 based on the received signals, and identify missing equipment 124 by comparing present equipment 124 to various inventory checklists) to identify pieces of equipment 124 missing from the fire truck.

In some embodiments, the inventory fault identification module 704 may interface with other emergency response vehicles (e.g., other fire trucks similar to the fire truck 100 located at the same station) or computing systems to identify various faults in the equipment 124 of the fire truck 100. For example, another fire truck may generate a report identifying various pieces of equipment on the fire truck (e.g., via an inventory tracking module similar to the inventory tracking module 212 discussed above) and transmit the report to the fire truck 100 via a secure connection. Upon receipt of such a report (e.g., via communications interface 222, as controlled by the onboard communications module 208), the processor 204 may assess the report by executing the inventory fault identification module 704. As discussed above, inventory reports generated by the vehicle management system 120 may include a plurality of EIDs, with each EID being associated with a separate piece of equipment. These EIDs may be previously established by the organization (e.g., department, municipality, or the like) with which the fire truck 100 is associated. Each fire truck, such as the fire truck 100, may be assigned a set of equipment 124. Thus, a specific set of EIDs may be assigned to the fire truck 100. Thus, upon receipt of the inventory report from another fire truck, the vehicle management system 120 may cross reference the EIDs contained in the report with the list of EIDs previously assigned to the fire truck 100 to determine if any of the equipment 124 previously assigned to the fire truck 100 is currently located on another fire truck. Such a misplacement may be identified as an inventory fault. As such, management personal may monitor the organization of pieces of equipment 124 amongst various response vehicles.

Additionally, inventory fault identification module 704 may further receive various inputs provided by the user during the inspections discussed above to identify other inventory faults. For example, the user may inspect the equipment 124 as instructed by the inspection assistance module 216, identify a fault, and provide an input identifying the fault via the inspection interfaces discussed above. Upon receipt of the input by the vehicle management system 120, the inventory fault identification module 704 may identify the fault based on the input.

As shown in FIG. 7, the readiness assessment module 218 further includes a scoring module 706 configured to determine the fire truck 100's readiness to respond to various emergency situations. In an exemplary embodiment, the vehicle management system 120 is configured to determine a readiness reduction score for each of the various faults in the vehicle subsystems 102-110, equipment 124, and other components of the fire truck 100 detected by the subsystem fault identification module 702 and the inventory fault identification module 704 via the scoring module 706. For each identified fault, the scoring module 706 may cause the processor 204 to access a lookup table to identify such a readiness reduction score. For example, for a vehicle subsystem fault associated with a particular vehicle subsystem 102-110 identified via the sensor signals captured by the vehicle subsystem controllers 112-118, a lookup table associated with the vehicle subsystem 102-110 may be accessed. The lookup table may include a plurality of entries. Each entry may include a sensor signal level and a readiness reduction score. The readiness reduction scores may be determined, for example, by department with which the fire truck 100 is associated or by various subscribers to the fire truck 100. In an example, if a fault in the water/agent tank 106 is detected (e.g., the water level and/or the agent in the water/agent tank 106 is low), a readiness reduction score is assigned to the water/agent tank 106 based on the detected water level and/or agent level. On the lookup table, the lower water level measured (e.g., by the pump control system 116), the higher readiness reduction score.

In another example regarding various pieces of equipment 124 that are present or not present on the fire truck 100, the scoring module 706 may include an inventory lookup table that assigns a readiness reduction score to each piece of equipment 124 missing from the fire truck 100. To illustrate, the inventory lookup table may include a first readiness reduction score associated with a missing axe, a second readiness reduction score associated with a missing air canister, and a third readiness reduction score associated with a missing hose. Accordingly, if, via the various methods disclosed herein, the vehicle management system 120 determines that the fire truck 100 is missing an axe, two compressed air cylinders, and a missing hose, the corresponding readiness reduction scores may be identified based on the inventory lookup table and added to generate a total inventory readiness reduction score.

Further, the scoring module 706 may assign additional readiness reduction scores based on various inputs received during an inspection of the fire truck 100. In one embodiment, the user may individually assign readiness reduction scores to various pieces of equipment 124 or vehicle subsystems 102-110 while inspecting the vehicle. For example, the various inspection interfaces discussed above may enable the user to input a readiness reduction score for each aspect (e.g., inspect point, equipment 124, vehicle subsystem 102-110, or other component) of the fire truck 100 inspected. In such embodiments, the scoring module 706 may retrieve the most recent inspection report (e.g., from the vehicle database 220 or a remote server), identify the various readiness reduction scores assigned by the user, and assign the scores to the various components.

Alternatively or additionally, the scoring module 706 may include a plurality of inspection lookup tables. Each inspection lookup table may be associated with a particular piece of equipment 124 or other aspect of the fire truck 100. The inspection lookup tables may list a plurality of potential defects of the associated equipment 124 or other aspect and various readiness reduction scores associated with the listed potential defects. Thus, upon receiving an input from the user device 132 indicating the presence of a particular defect of a particular piece of equipment 124, the associated lookup table may be accessed to determine the readiness reduction score for the identified defect. Thus, after a complete inspection, the scoring module 706 may cause a plurality of readiness reduction scores to be generated for various identified defects.

Once a plurality of readiness reduction scores have been determined (e.g., associated with the vehicle subsystems 102-110, equipment 124, and various other aspects of the fire truck 100), the scoring module 706 may further configure the processor 204 to determine an overall readiness reduction score for the current state of the fire truck 100. In an exemplary embodiment, the overall readiness reduction score is a weighted combination of the various individual readiness reduction scores assigned to the various aspects of the fire truck 100 discussed above. Accordingly, the scoring module 706 may include a multi-step algorithm for determining the overall readiness reduction score. First, a component readiness reduction score for each individual component of the fire truck 100 may be determined. The component readiness reduction score may include a weighted combination of the readiness reduction scores associated with each fault of a particular component of the fire truck. For example, a vehicle subsystem 102-110 may have multiple faults: a fault based on the sensor signal captured by an associated vehicle subsystem controller and a fault based on an inspection of the subsystem 102-110. As such, the scoring module 706 discussed above may have identified various readiness reduction scores for the vehicle subsystem 102-110. To determine the component readiness reduction score, a weighted average of the readiness reduction scores may be calculated. The weights may be predetermined by various management personnel or the manufacturer of the fire truck 100.

The various component readiness reduction scores may then be combined using various additional weights to compute the overall readiness reduction score. In various embodiments, such weights may vary depending on the particular circumstances of the fire truck 100. For example, the weights assigned to each component readiness reduction score may differ depending on the type of incident that the fire truck 100 is responding to. To illustrate, a foam system of the fire truck 100 may receive a greater weight if the fire truck 100 is being used to respond to a vehicle fire rather than a brush fire (e.g., because foam systems are more heavily utilized when responding to vehicle fires). Accordingly, the scoring module 206 may include a plurality of weight sets, and the particular weight set used to compute the overall readiness reduction score may vary depending on an input provided by the operator or other user. For example, upon receiving a call regarding a vehicle fire, a commander at a fire station may provide an input (e.g., via the user device 132) to the vehicle management system 120. Upon receipt of the input, the scoring module 206 may retrieve the most recent reports generated by the subsystem diagnostic module 210, the inventory tracking module 212, and the inspection assistance module 216; compute various component readiness reduction scores; and compute the overall readiness reduction scores using the weights of the scoring module 206 associated with vehicle fires. Thus, the commander may utilize the readiness reduction scores to properly assign response vehicles to various types of incidents.

As shown in FIG. 7, the readiness assessment module 218 further includes a reporting module 708 configured to generate various reports based on the various readiness reduction scores computed via the methods discussed above. The reporting module 708 may generate various alerts if any component readiness reduction scores or the overall readiness reduction scores reach various predetermined thresholds. Such alerts may be formatted to be presented on the display 122 or as webpages viewable on the user device 132. Additionally, the reporting module 708 may generate an overall readiness report indicating the various readiness scores computed via the methods discussed above.

In some embodiments, various inputs may be provided to various vehicle subsystem controllers 112-118 if a readiness reduction score reaches various thresholds. For example, if the overall readiness reduction score reaches a threshold, the engine control system 114 may be placed in an override mode. In such a mode, upon an operator attempting to start the fire truck 100, the operator may be presented with an un-readiness alert on the display 122. Further, no activation signals are provided to the engine 104 unless the operator selects an override option on the alert and inputs valid authentication credentials. This way, emergency personnel are proactively prevented from using poorly equipped vehicles.

Figure 8:
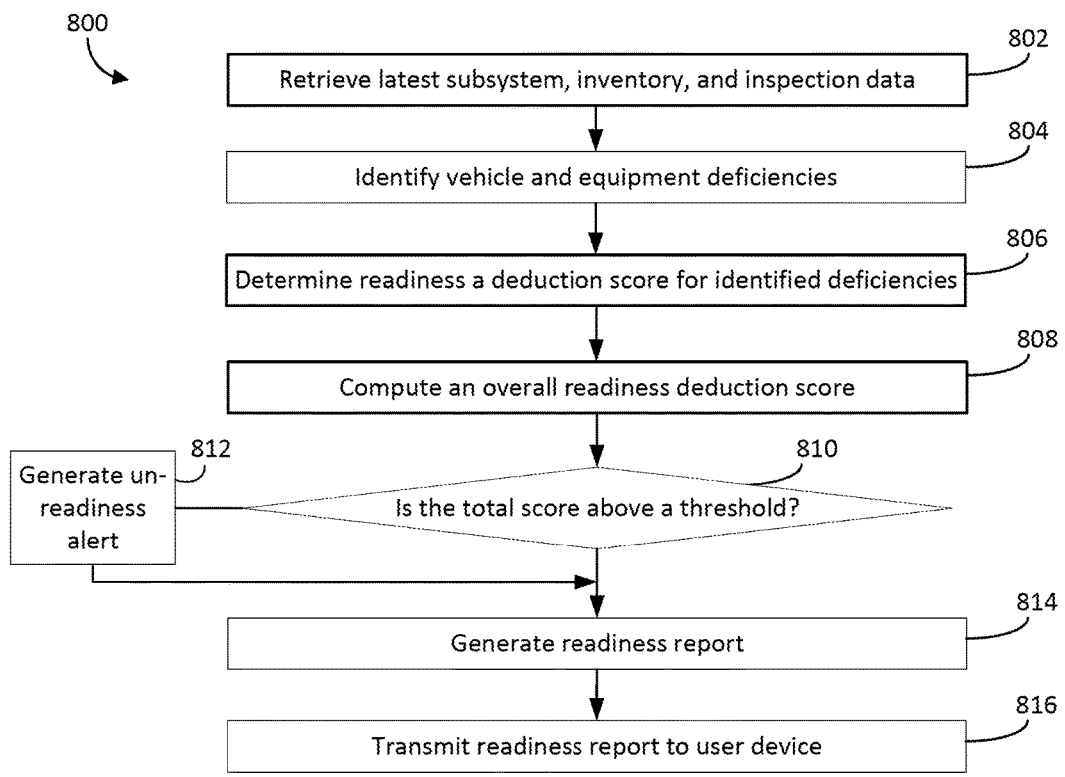
FIG. 8 is flow chart of a process for determining the response readiness of the emergency response vehicle, according to an exemplary embodiment.

Referring now to FIG. 8, a flow chart of a process 800 for determining the readiness of a response vehicle is shown. Process 800 may be executed by, for example, the readiness assessment module 218. Process 800 may be executed to provide the results of a readiness score determination to a manager or other personnel remote from the vehicle. For example, a commander may receive readiness reports pertaining to various fire trucks 100 associated with a particular station, and may manage the use of the fire trucks based on the reports.

Process 800 includes retrieving the latest subsystem, inventory, and inspection data (block 802). For example, the subsystem diagnostic module 210, the inventory tracking module 212, and the inspection assistance module 216 may perform the various processes described thereof to obtain various forms of information regarding the condition regarding a plurality of aspects of the fire truck 100. This information may be stored in the vehicle database 220 and/or a remote server (e.g., in the form of the various reports discussed above). Accordingly, the latest of such reports may be retrieved.

Process 800 includes identifying various vehicle and equipment deficiencies (block 804). As discussed above, such deficiencies may be determined by comparing sensor signals from vehicle subsystem controllers 112-118 to various thresholds, receiving inventory lists determined by the inventory tracking module 212, and receiving various inspection inputs from the user device 132.

Process 800 includes determining readiness reduction scores for each of the deficiencies identified at 804 (block 806) and computing an overall readiness reduction score for the fire truck 100 (block 808). For example, the processor 204 may access various lookup tables included in the scoring module 706 of the readiness assessment module 218 to identify various readiness reduction scores associated with the identified deficiencies. Additionally, a weighted combination of the identified readiness reduction scores may be computed to generate the overall readiness reduction score for the fire truck 100. As discussed above, the weights used in such a calculation may vary depending on an input provided to the vehicle management system 120 indicating the type of incident that the fire truck is to respond to.

Process 800 further includes determining if the overall readiness reduction score is above a threshold (block 810). The readiness assessment module 218 may include a plurality of readiness thresholds, with each threshold being associated with a level of urgency as to truck repair or replenishment. For example, a first threshold may be associated with a mild need to repair or provide equipment to the fire truck 100, a second threshold may be associated with a semi-urgent need to repair or provide equipment to the fire truck 100, and a third threshold may be associated with an urgent need to repair or provide equipment to the fire truck 100. If the total readiness reduction score calculated at 808 is above any of these thresholds, an un-readiness alert is generated (block 812). The alert may inform various personnel (e.g., the operator via the display 122, a commander via a user device 132, etc.) that the fire truck 100 needs improvement. Further, the alert may identify the particular pieces of equipment 124 or vehicle subsystems 102-110 having faults.

Process 800 further includes generating a readiness report (block 814). For example, based on the various un-readiness scores computed at blocks 806-808, a report may be generated that includes the overall readiness score of the fire truck as well as the individual component readiness scores. Each component readiness score may vary in color depending on the relationships of the component readiness scores to various thresholds. For example, individual components having a readiness reduction score above a threshold may show up as red (indicating a need of repair), while other components found to be without fault may show up as green on the report. The report may be formatted as a webpage and transmitted via the communications interface to the user device 132 (block 816). As such, various emergency response personnel may be made aware of the readiness of the fire truck 100.

Figure 9:
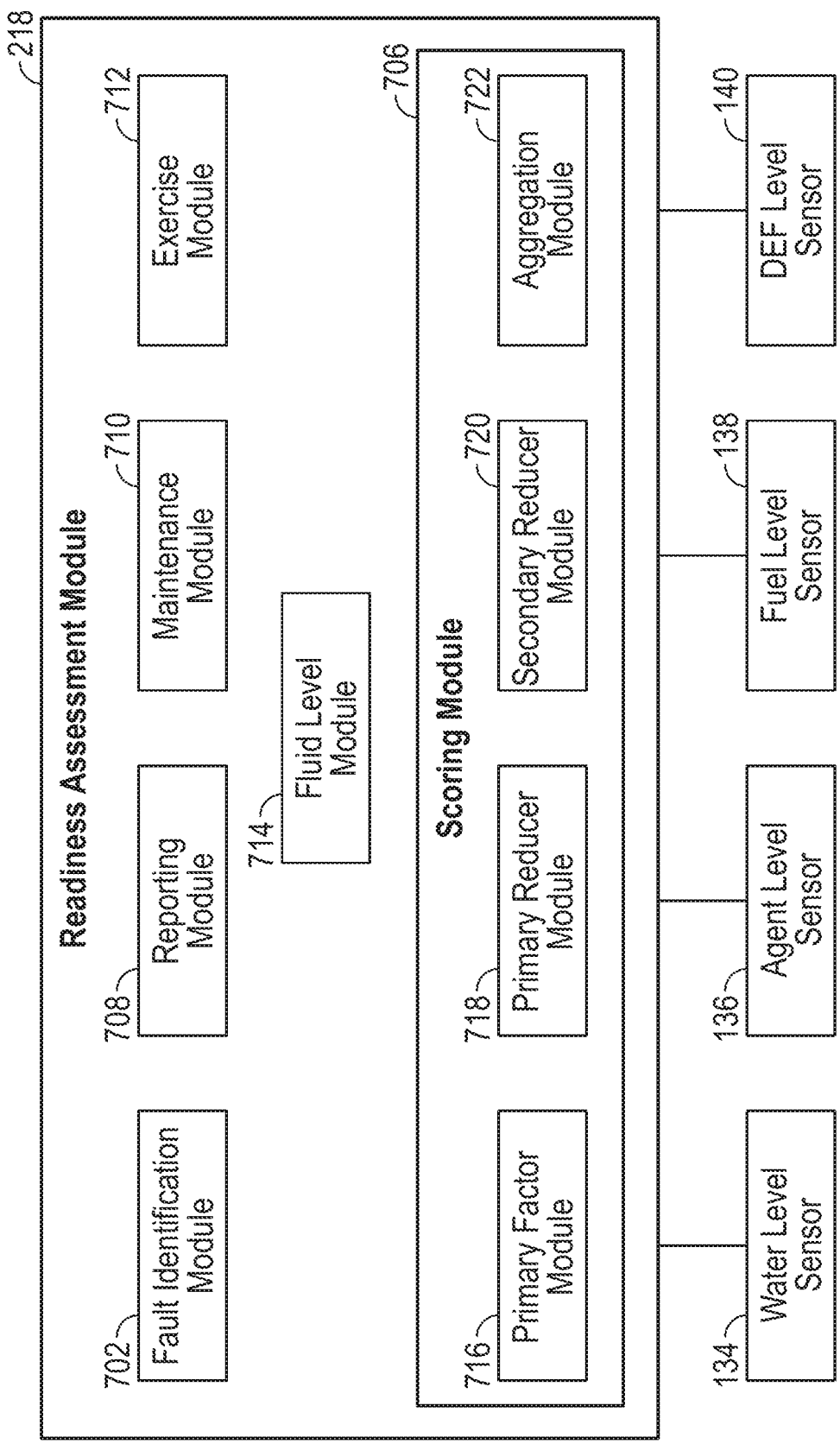
FIG. 9 is a detailed block diagram of a readiness assessment module of the vehicle management system, according to another exemplary embodiment.

Referring now to FIG. 9, the readiness assessment module 218 of the vehicle management system 120 is described in greater detail, according to another exemplary embodiment. The readiness assessment module 218 of FIG. 9 may interface with the same, more, fewer, or different modules as described with regards to FIG. 7. As shown in FIG. 9, the readiness assessment module 218 includes the subsystem fault identification module 702, the scoring module 706, and the reporting module 708 like in FIG. 7, but additionally includes a maintenance module 710, an exercise module 712, and a fluid level module 714. In some embodiments, the readiness assessment module of FIG. 9 additionally includes the inventory fault identification module 704.

Airport rescue fire fighting ("ARFF") response is an extremely time sensitive operation. Further, the incidence of an aircraft crash or an aircraft involved fire is a rare event. To provide an effective response to an incident that is rare requires a high level of training and apparatus testing to ensure readiness. From an apparatus perspective, any problem that delays or otherwise impairs a response of the apparatus is potentially catastrophic in the event of an aircraft emergency. Many factors must be considered to evaluate the readiness of an ARFF apparatus (e.g., the fire truck 100, etc.) for a response. These factors may include fuel levels, water levels, agent levels, diesel exhaust fluid ("DEF") levels, and/or the state of health of the ARFF apparatus. The state of health of the ARFF apparatus may depend on a variety of factors that include system faults, maintenance, exercise schedule, and/or the recent activity of the ARFF apparatus. According to an exemplary embodiment, the readiness assessment module 218 evaluates many of the above factors to provide a measure of the ability of the ARFF apparatus to respond to an incident (e.g., an aircraft crash or fire, etc.). The readiness assessment module 218 may regularly acquire and interpret data regarding the above factors for evaluation according to a readiness algorithm that may be used to generate a readiness score for the ARFF apparatus. Such a readiness score may be used by operators to aid in apparatus maintenance, exercise schedules, and operation schedules, as well as may be used as a measure to indicate the current capability of the ARFF apparatus to respond to an incident.

The subsystem fault identification module 702 of the readiness assessment module 218 of FIG. 9 may be configured to perform the various functions described above with regards to FIG. 7. The subsystem fault identification module 702 may additionally or alternatively be configured to monitor and classify the significance of a fault the fire truck 100 is experiencing and store such information as fault data. By way of example, the subsystem fault identification module 702 may classify a more significant fault (e.g., an urgent fault, a critical fault, etc.) that may require immediate attention as a serious fault (e.g., an engine malfunction or failure, pump failure, etc.). A fault may be more significant when the presence of the respective fault impacts or diminishes the effectiveness of the fire truck 100 to respond to an incident at the current moment (e.g., unable to be driven, unable to discharge water or agent, etc.). By way of another example, the subsystem fault identification module 702 may classify a less significant fault (e.g., a less urgent fault, a non-urgent fault, etc.) as a moderate or minor fault (e.g., low tire pressure, exhaust emissions related issues, etc.). A fault may be moderate or minor when the presence of the respective fault does not directly affect the ability of the fire truck 100 to currently respond to an incident.

The maintenance module 710 may be configured to track or monitor the maintenance history performed on the fire truck 100 according to a maintenance schedule (e.g., based on time of operation, mile driven, time since maintenance was last performed, etc.) and store such maintenance history as maintenance data. By way of example, the maintenance module 710 may determine whether maintenance is not due, due, or overdue. Maintenance that is due or overdue may adversely impact (e.g., reduce, etc.) the readiness score for the fire truck 100.

The exercise module 712 may be configured to track or monitor the exercise history of the fire truck 100 (e.g., how recently the fire truck 100 was exercised, etc.) and store such exercise history as exercise data. Exercising the fire truck 100 may include starting the engine 104, driving the fire truck 100, engaging the pump 108, opening a water/agent discharge (e.g., to expel water and/or agent therefrom, etc.), and/or still other exercise operations of other components of the fire truck 100. Lack of recent exercising of the fire truck 100 and the components thereof (e.g., the engine 104, the pump 108, the water/agent discharge, etc.) may adversely impact (e.g., reduce, etc.) the readiness score for the fire truck 100.

The fluid level module 714 may be configured to monitor the levels of fluid within various components of the fire truck 100 (e.g., water level, agent level, fuel level, DEF level, etc.) and store such levels of fluid as fluid level data. By way of example, as shown in FIG. 9, the fluid level module 714 may be coupled to a first sensor, shown as water level sensor 134, configured to acquire data indicative of a water level within a water tank of the water/agent tank 106; a second sensor, shown as agent level sensor 136, configured to acquire data indicative of an agent level within an agent tank of the water/agent tank 106; a third sensor, shown as fuel level sensor 138, configured to acquire data indicative of a fuel level within a fuel tank of the fire truck 100; and a fourth sensor, shown as DEF level sensor 140, configured to acquire data indicative of a DEF level within a DEF reservoir of the of the fire truck 100. The data regarding the water level, the agent level, the fuel level, and/or the DEF level may indicate that its corresponding tank or reservoir is filled anywhere between 0% of the capacity (i.e., empty) to 100% of the capacity (i.e., completely full). The lower the water level, the agent level, the fuel level, and/or the DEF level are may adversely impact (e.g., reduce, etc.) the readiness score for the fire truck 100.

The scoring module 706 may be configured to receive the fault data from subsystem fault identification module 702, the maintenance data from the maintenance module 710, the exercise data from the exercise module 712, and/or the fluid level data from the fluid level module 714. The scoring module 706 may be further configured to determine a readiness score for the fire truck 100 based on the fluid level data, the fault data, the maintenance data, and/or the exercise data (e.g., to be used as a measure to indicate the current capability of the fire truck 100 to respond to an incident, etc.).

As shown in FIG. 9, the scoring module 706 includes a primary factor module 716, a primary reducer module 718, a secondary reducer module 720, and an aggregation module 722. The primary factor module 716 may be configured to identify and evaluate primary factors from the fluid level data, the fault data, the maintenance data, and/or the exercise data. According to an exemplary embodiment, the primary factors are factors that define a maximum capability of the fire truck 100 to carry out a response to an incident (e.g., an aircraft crash response, etc.). The primary factor module 716 may be configured to determine a primary factor value based on the primary factors identified from the fluid level data, the fault data, the maintenance data, and/or the exercise data. The primary factor value ranges from 0 to 100, according to an exemplary embodiment. According to an exemplary embodiment, the primary factors include the current water level within the water tank of the water/agent tank 106 and/or the current agent level within an agent tank of the water/agent tank 106. The primary factor module 716 may be configured to set the primary factor value to the lower of the water level and the agent level. By way of example, if the water tank is 95% full and the agent tank is 88% full, the primary factor module 716 may be configured to set the primary factor value to 88. By way of another example, if the water tank is 50% full and the agent tank is 72% full, the primary factor module 716 may be configured to set the primary factor value to 50. In other embodiments, the primary factors include additional or different factors from the fluid level data, the fault data, the maintenance data, and/or the exercise data.

The primary reducer module 718 may be configured to identify and evaluate primary reducers from the fluid level data, the fault data, the maintenance data, and/or the exercise data. According to an exemplary embodiment, the primary reducers are factors that negatively influence the ability of the fire truck 100 to currently respond to an incident. The primary reducer module 718 may be configured to determine a primary reducer value based on the primary reducers identified from the fluid level data, the fault data, the maintenance data, and/or the exercise data. According to an exemplary embodiment, the primary reducers include the current fuel level within the fuel tank of the fire truck 100 and/or active serious faults. The primary reducer module 718 may be configured to set the primary reducer value based on the current fuel level and/or an indication that one or more serious faults are present.

A serious fault may correspond with a predefined value that is incorporated into the primary reducer value. In one embodiment, the predefined value per active serious fault is 25. In other embodiments, the predefined value is less than or greater than 25 (e.g., 15, 20, 30, etc.) per active serious fault. In still other embodiments, the value for a serious fault is determined using a look-up table (e.g., each individual serious fault has a different value associated therewith, etc.). The value associated with the fuel level may be determined based on the difference between the maximum capacity of the fuel tank (i.e., 100%) and the current fuel level within the fuel tank. By way of example, if the fuel tank is 85% full, the value for the fuel level that is incorporated into the primary reducer value may be 15. By way of another example, if the fuel tank is 32% full, the value for the fuel level that is incorporated into the primary reducer value may be 68. As an overall example for the primary reducer value, if there is a single active serious fault and the fuel tank is 95% full, the primary reducer value is 30 (i.e., 25 for the serious fault and 5 for the fuel level). As another overall example for the primary reducer value, if there is no active serious faults and the fuel tank is 97% full, the primary reducer value is 3 (i.e., 0 for the serious fault and 3 for the fuel level). In other embodiments, the primary reducers include additional or different factors from the fluid level data, the fault data, the maintenance data, and/or the exercise data.

The secondary reducer module 720 may be configured to identify and evaluate secondary reducers from the fluid level data, the fault data, the maintenance data, and/or the exercise data. According to an exemplary embodiment, the secondary reducers are factors that may negatively influence the function of the fire truck 100 over an extended period of time, but do not directly affect the ability of the fire truck 100 to currently respond to an incident. The secondary reducer module 720 may be configured to determine a secondary reducer value based on the secondary reducers identified from the fluid level data, the fault data, the maintenance data, and/or the exercise data. According to an exemplary embodiment, the secondary reducers include maintenance being due/overdue, the current DEF level within the DEF reservoir of the fire truck 100, active moderate faults, and/or the recent exercise history of the fire truck 100 and the components thereof (e.g., the engine 104, the pump 108, the water/agent discharge, etc.). The secondary reducer module 720 may be configured to set the secondary reducer value based on an indication that maintenance is due/overdue, the current DEF level, an indication of one or more moderate faults being present, and/or an indication of a lack of recent exercise history.

Maintenance being due or overdue may correspond with a predefined value that is incorporated into the secondary reducer value. Maintenance not being due may correspond with a predefined value of 0. In some embodiment, the value for maintenance being due is the same as the value for maintenance being overdue. In one embodiment, the predefined value for maintenance being due or overdue is 5. In other embodiments, the predefined value is less than or greater than 5 (e.g., 3, 7, 10, etc.). In some embodiments, the value for maintenance being due is different than (e.g., less than, etc.) the value for maintenance being overdue. By way of example, the value for maintenance being due may be 5, while the value for maintenance being overdue may be 10.

The value associated with the DEF level may be determined based on a proportion of the difference between the maximum capacity of the DEF reservoir (i.e., 100%) and the current DEF level within the DEF reservoir (i.e., a proportion of the amount of the DEF reservoir that is empty). According to an exemplary embodiment, the proportion of the difference is 10%. By way of example, if the DEF reservoir is 70% full, the value for the DEF level that is incorporated into the secondary reducer value is 3 (i.e., (100−70)(10%)). By way of another example, if the DEF reservoir is 45% full, the value for the DEF level that is incorporated into the secondary reducer value is 5.5 (i.e., (100−45)(10%)). In other embodiments, proportion of the difference is less than or greater than 10% (e.g., 5%, 15%, 20%, 25%, etc.).

A moderate fault may correspond with a predefined value that is incorporated into the secondary reducer value. In one embodiment, the predefined value per active moderate fault is 5. In other embodiments, the predefined value is less than or greater than 5 (e.g., 3, 7, 10, etc.) per active moderate fault. In still other embodiments, the value for a moderate fault is determined using a look-up table (e.g., each individual moderate fault has a different value associated therewith, etc.).

Exercise history may indicate how recently the fire truck 100 was exercised. The value associated with the exercise history may increase as a function of time. By way of example, if the fire truck 100 was exercised (e.g., the engine 104 was started, the fire truck 100 was driven, the pump 108 was engaged, a discharge was opened, etc.) within the last 24 hours, the value associated with the exercise history may be 0. If the fire truck 100 was exercised within the last 48 hours, but not within the last 24 hours, the value associated with the exercise history may be 10. If the fire truck 100 was exercised more the last 48 hours ago, the value associated with the exercise history may be 15. In some embodiments, as time elapses since the systems of the fire truck 100 have been exercised, the value associated with the exercise history is increased by 1 per week for each system that has not been exercised.

The aggregation module 722 may be configured to receive the primary factor value from the primary factor module 716, the primary reducer value from the primary reducer module 718, and the secondary reducer value from the secondary reducer module 720. The aggregation module 722 may thereafter be configured to determine a readiness score for the fire truck 100 based on the primary factor value, the primary reducer value, and the secondary reducer value according to the following expression:

$$R = V_{PF} - V_{PR} - V_{SR} \quad (1)$$

where R is the readiness score, $V_{PF}$ is the primary factor value, $V_{PR}$ is the primary reducer value, and $V_{SR}$ is the secondary reducer value.

Figure 10:
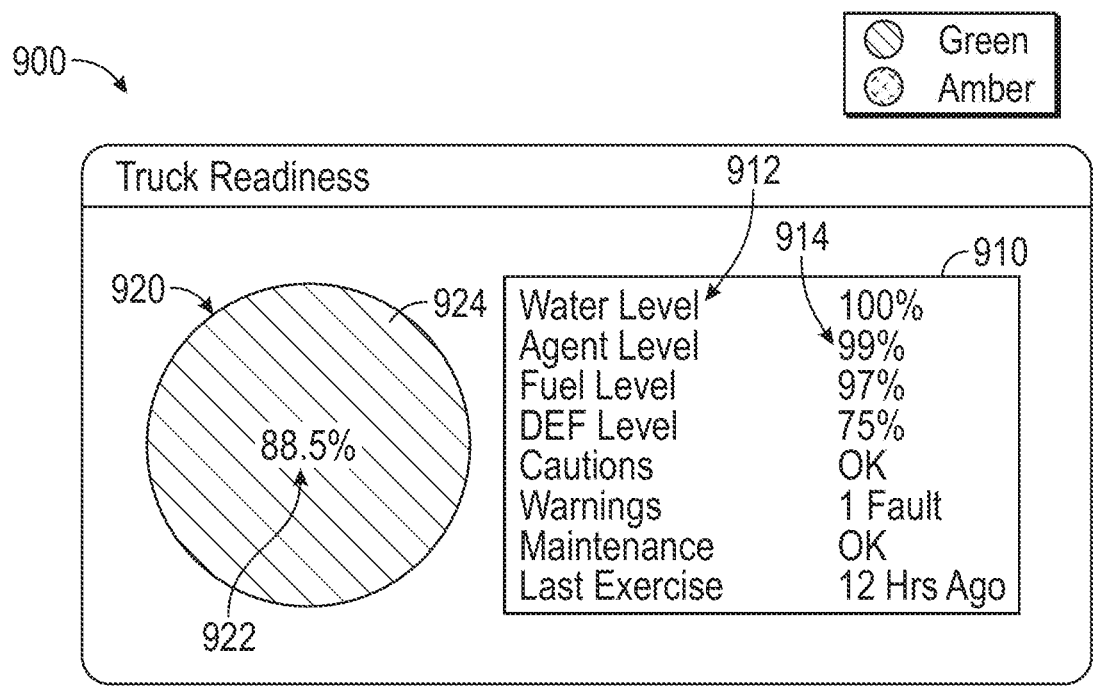
FIGS. 10 and 11 are schematic diagrams of a readiness score graphical user interface, according to various exemplary embodiments.
Figure 11:
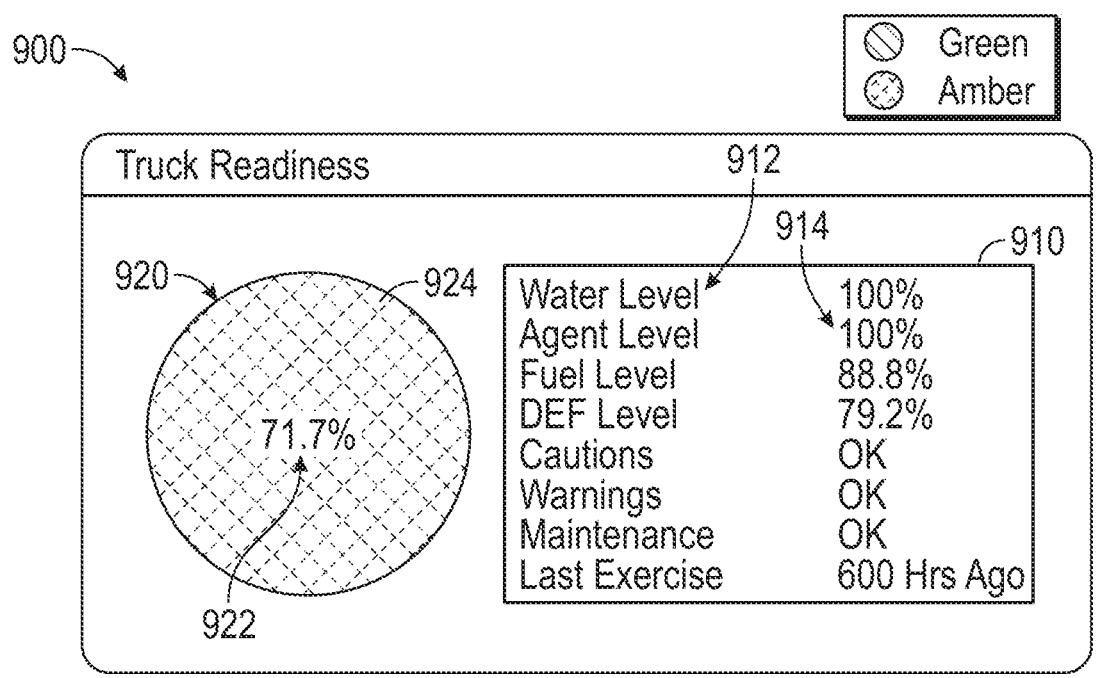

The reporting module 708 may be configured to (i) facilitate displaying the readiness score to an operator on the display device 122 of the fire truck 100 and/or on the user device 132 and/or (ii) transmit the readiness score to a remote server 142. As shown in FIGS. 10 and 11, a readiness graphical user interface ("GUI"), shown as readiness GUI 900, may be displayed on the display device 122 and/or the user device 132. The readiness score GUI 900 is configured to provide the readiness score for a respective fire truck 100 such that the operator is aware of how ready the fire truck 100 is to respond to an incident.

As shown in FIGS. 10 and 11, the readiness score GUI 900 includes a first section, shown as readiness factors section 910, and a second section, shown as readiness score section 920. The readiness factors section 910 includes a plurality of factors, shown as readiness factors 912. Each readiness factor 912 has an associated status or value, shown as factor status 914. The readiness factors 912 include the primary factors (e.g., the water level, the agent level, etc.), the primary reducers (e.g., the fuel level, the cautions or serious faults, etc.), and the secondary reducers (e.g., the DEF level, the warnings or moderate faults, the maintenance indication, the exercise history, etc.). The readiness score section 920 includes a score, shown as readiness score 922, and a background indicator, shown as readiness background 924. The readiness score 922 indicates the overall readiness of the fire truck 100 for responding to an incident.

As shown in Table 1, the factor statuses 914 of the readiness factors 912 and the readiness background 924 may be displayed on the readiness score GUI 900 in various colors-green, amber, or red—based on the respective value or status of each readiness factor 912 and the value of the readiness score 922, respectively. By way of example, the readiness background 924 may be displayed in green if the readiness score 922 is greater than or equal to 85%, while the readiness background 924 may be displayed in amber if the readiness score 922 is less than 85%. By way of another example, the factor statuses 914 for the water level, the agent level, and/or the fuel level may be displayed in green when their respective value is greater than 92%, amber when their respective value is between 80% and 92%, and red when their respective value is less than 80%. By way of yet another example, the factor status 914 for the serious faults is green when there are no serious faults and red when there is at least one serious fault. By way of still another example, the factor status 914 for the moderate faults may be green when there are no moderate faults and amber when there is at least one moderate fault. By way of yet still another example, the factor status 914 for maintenance may be green when there no maintenance is due and amber when maintenance is due or overdue. By way of another example, the factor status 914 for the DEF level may be displayed in green when the DEF level is greater than 50%, amber when the DEF level is between 45% and 50%, and red when the DEF level is less than 45%. By way of still another example, the factor status 914 for the exercise history may be green when the fire truck 100 has been exercised within the last two days, amber when the fire truck 100 has not been exercised in between two and seven days, and red when the fire truck 100 has not been exercised in more than seven days. It should be noted that the values of the various factor statuses 914 that activate the green, amber, and red colors presented in Table 1 are for illustration only. The values associated with the green, amber, and red for each readiness factor 912 may therefore vary from what is presented in Table 1.

TABLE 1

| | Readiness Factor | Factor Status | | |
| --- | --- | --- | --- | --- |
| | | Green | Amber | Red |
| | Readiness | Greater than 85% | Less than 85% | — |
| Primary Factors | Water Level | Greater than 92% | Between 80% and 92% | Less than 80% |
| | Agent Level | Greater than 92% | Between 80% and 92% | Less than 80% |
| Primary Reducers | Fuel Level | Greater than 92% | Between 80% and 92% | Less than 80% |
| | Cautions/ Serious Faults | OK | — | 1 or more |
| Secondary Reducers | DEF Level | Greater than 50% | Between 45% and 50% | Less than 45% |
| | Warnings/ Moderate Faults | OK | 1 or more | — |

TABLE 1-continued

| Readiness Factor | Factor Status | | |
|---|---|---|---|
| | Green | Amber | Red |
| Maintenance Indication | OK | Due/Overdue | — |
| Last Exercise | Less than 2 days | Between 2 and 7 days | More than 7 days |

As an illustration, in FIG. 10, the primary factor value is 99 (i.e., selected from the lower of the water level of 100 and the agent level of 99), the primary reducer value is 3 (i.e., (100−97)=3 for the fuel level and 0 for the no serious faults present), and the secondary reducer value is 7.5 (i.e., (100−75)(10%)=2.5 for the DEF level and 5 for the single moderate fault) such that the readiness score 922 is 88.5%. As another illustration, in FIG. 11, the primary factor value is 100 (i.e., selected from the lower of the water level of 100 and the agent level of 100), the primary reducer value is 11.2 (i.e., (100-88.8)=11.2 for the fuel level and 0 for the no serious faults present), and the secondary reducer value is 17.08 (i.e., (100−79.2)(10%)=2.08 for the DEF level and 15 for the for the fire truck 100 not being exercised in more than 48 hours) such that the readiness score 922 is 71.7%.

Figure 12:
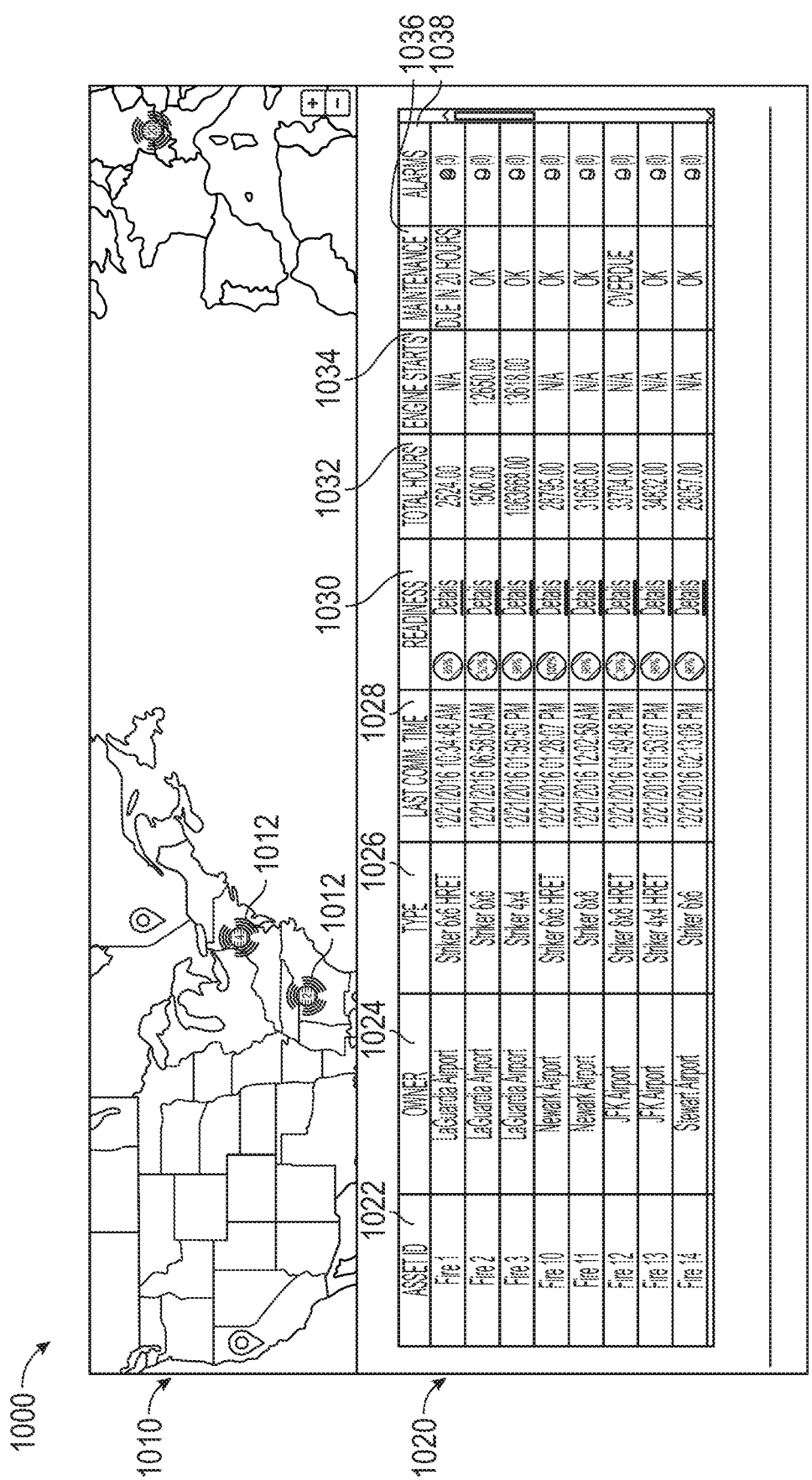
FIG. 12 is a schematic diagram of a fleet readiness report graphical user interface, according to an exemplary embodiment.

As shown in FIG. 12, the remote server 142 is configured to receive the readiness score and all the associated information regarding a fire truck from a plurality of fire trucks 100 and provide a global telematics interface, shown as fleet readiness report interface 1000. According to an exemplary embodiment, the fleet readiness report interface 1000 is configured to provide an operator (e.g., a fleet manager, a manufacturer, etc.) with a comprehensive readiness report for a fleet such that the operator has the ability to remotely monitor the readiness of a plurality of fire trucks in the fleet. As show in FIG. 12, the fleet readiness report interface 1000 includes a first section, shown as map section 1010, and a second section, shown as information section 1020. The map section 1010 includes indicators, shown as position indicators 1012. Each position indicator 1012 may provide an indication of the location of a respective fire truck 100 within a respective fleet. An operator may therefore identify the location of fire trucks 100 within the fleet.

As shown in FIG. 12, the information section 1020 includes a plurality of columns, shown as asset ID column 1022, owner column 1024, type column 1026, last communication time column 1028, readiness column 1030, total hours column 1032, engine starts column 1034, maintenance column 1036, and alarms column 1038. The asset ID column 1022 provides an identifier (e.g., name, VIN, other ID, etc.) for each respective fire truck 100 within the fleet. The owner column 1024 provides an indication of the name of the owner (e.g., which airport owns the ARFF truck, etc.) for each respective fire truck 100 within the fleet. The type column 1026 provides an indication of the type (e.g., model, etc.) of each respective fire truck 100 within the fleet. The last communication time column 1028 provides an indication of the last time the remote server 142 received data from or otherwise communicated with each respective fire truck 100 within the fleet. The readiness column 1030 provides an indication of the readiness score for each respective fire truck 100 within the fleet. An operator may select a respective readiness score within the readiness column 1030 and thereafter be directed to the readiness score GUI 900 corresponding with the selected fire truck 100 for a more detailed view of the readiness score of the fire truck 100. The total hours column 1032 provides an indication of a total number of operation each respective fire truck 100 within the fleet has been used for. The engine starts column 1034 provides an indication of a number of times the engine 104 of each respective fire truck 100 within the fleet has been started. The maintenance column 1036 provides an indication of whether maintenance is not due, due, or overdue for each respective fire truck 100 within the fleet. An operator may select a respective maintenance indicator within the maintenance column 1036 and thereafter be provided a more detailed view of the maintenance that is required for the corresponding fire truck 100. The alarms column 1038 provides an indication of a number of alarms (e.g., cautions, warnings, serious faults, moderate faults, etc.) each respective fire truck 100 within the fleet may be experiencing. An operator may select a respective alarm indicator within the alarms column 1038 and thereafter be provided a more detailed view of the various cautions and warnings for the corresponding fire truck 100.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

For purposes of this disclosure, the term "coupled" means the joining of two members directly or indirectly to one another. Such joining may be stationary in nature (e.g., permanent, etc.) or moveable in nature (e.g., removable, releasable, etc.). Such joining may allow for the flow of electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The construction and arrangements of the systems and methods, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements. The position of elements may be reversed or otherwise varied. The nature or number of discrete elements or positions may be altered or varied. Although the figures may show a specific order of method steps, the order of the steps may differ from what is depicted. Also two or more steps may be performed concurrently or with partial concurrence. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. All such variations are within the scope of the disclosure. Likewise, software implementations could be accomplished with standard programming techniques with rule based logic and other logic to accomplish the various connection steps, processing steps, comparison steps and decision steps. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

The invention claimed is:
1. A fire apparatus comprising:
an engine;
at least one of (i) a water tank configured to store water or (ii) an agent tank configured to store a fire suppressing agent;
a fuel tank configured to store a fuel used to power the engine;
one or more sensors positioned to acquire fluid level data indicating at least one of a water level within the water tank, a fire suppressing agent level within the agent tank, or a fuel level within the fuel tank; and
a processing circuit coupled to the one or more sensors, the processing circuit including one or more memory devices coupled to one or more processors, the one or more memory devices configured to store instructions thereon that, when executed by the one or more processors, cause the one or more processors to:
monitor the fluid level data received from the one or more sensors;
monitor fault data indicating any active faults with components of the fire apparatus;
monitor maintenance data indicating whether maintenance is due or overdue;
monitor exercise data indicating an elapsed time since the fire apparatus was last exercised including the elapsed time since at least one of starting the engine, driving the fire apparatus, engaging a fluid pump of the fire apparatus, or opening a fluid discharge of the fire apparatus;
identify one or more primary factors, one or more primary reducers, and one or more secondary reducers from the fluid level data, the fault data, the maintenance data, and the exercise data;
determine a primary factor value associated with the one or more primary factors, a primary reducer value associated with the one or more primary reducers, and a secondary reducer value associated with the one or more secondary reducers; and
determine a readiness score for the fire apparatus by subtracting the primary reducer value and the secondary reducer value from the primary factor value;

wherein:
the one or more primary factors include at least one of (i) the water level within the water tank or (ii) the fire suppressing agent level within the agent tank;
the one or more primary reducers include at least one of (i) the fuel level within the fuel tank or (ii) the active faults that are classified as serious; and
the one or more secondary reducers include at least one of (i) a diesel exhaust fluid level within a diesel exhaust fluid reservoir, (ii) the active faults that are classified as moderate, (iii) the maintenance being due or overdue, or (iv) the elapsed time since the fire apparatus was last exercised.

2. The fire apparatus of claim 1, wherein the fire apparatus comprises the water tank and the agent tank.

3. The fire apparatus of claim 1, wherein the one or more memory devices are further configured to store instructions thereon that, when executed by the one or more processors, cause the one or more processors to transmit the readiness score to a display device configured to display a readiness graphical user interface including the readiness score.

4. The fire apparatus of claim 3, wherein the readiness graphical user interface includes a readiness factor section that lists a plurality of readiness factors having an associated status or value.

5. The fire apparatus of claim 4, wherein the one or more memory devices are further configured to store instructions thereon that, when executed by the one or more processors, cause the one or more processors to display each readiness factor in one of various colors based on the associated status or value of each readiness factor relative to one or more threshold statuses or values.

6. The fire apparatus of claim 3, wherein the display device includes at least one of a vehicle mounted display or a portable user device.

7. The fire apparatus of claim 1, wherein the one or more memory devices are further configured to store instructions thereon that, when executed by the one or more processors, cause the one or more processors to transmit the readiness score to a remote server.

8. The fire apparatus of claim 7, wherein the remote server is configured to receive the readiness score from a plurality of fire apparatuses of a fleet and provide a comprehensive readiness report for the fleet.

9. The fire apparatus of claim 1, wherein the one or more primary factors include the water level and the fire suppressing agent level, and wherein the one or more memory devices are further configured to store instructions thereon that, when executed by the one or more processors, cause the one or more processors to select the lower of a value associated the water level and a value associated with the fire suppressing agent level as the primary factor value.

10. The fire apparatus of claim 1, wherein the one or more memory devices are further configured to store instructions thereon that, when executed by the one or more processors, cause the one or more processors to determine the primary reducer value based on (i) the fuel level within the fuel tank and (ii) a predetermined value for each of the active faults classified as serious.

11. The fire apparatus of claim 1, further comprising the diesel exhaust fluid reservoir configured to store a diesel exhaust fluid, wherein the fluid level data further indicates the diesel exhaust fluid level within the diesel exhaust fluid reservoir.

12. The fire apparatus of claim 1, wherein the one or more memory devices are further configured to store instructions thereon that, when executed by the one or more processors, cause the one or more processors to determine the secondary reducer value based on (i) the diesel exhaust fluid level, (ii) a predetermined value for each of the active faults that are classified as moderate, (iii) a predetermined value for the maintenance being due or overdue, and (iv) a value for the elapsed time since the fire apparatus was last exercised as a function of time.

* * * * *